United States Patent
Yang et al.

(10) Patent No.: US 11,791,944 B2
(45) Date of Patent: Oct. 17, 2023

(54) UE TRIGGERED ONE-SHOT HARQ-ACK FEEDBACK

(71) Applicant: QUALCOMM Incorporated, San Diego, CA (US)

(72) Inventors: Wei Yang, San Diego, CA (US); Ahmed Elshafie, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 17/218,078

(22) Filed: Mar. 30, 2021

(65) Prior Publication Data

US 2022/0321270 A1 Oct. 6, 2022

(51) Int. Cl.
*H04L 1/1812* (2023.01)
*H04L 1/1829* (2023.01)
*H04L 1/1867* (2023.01)
*H04W 72/04* (2023.01)

(52) U.S. Cl.
CPC .......... *H04L 1/1812* (2013.01); *H04L 1/1861* (2013.01); *H04L 1/1893* (2013.01); *H04W 72/04* (2013.01)

(58) Field of Classification Search
CPC ... H04L 1/1812; H04L 1/1816; H04L 1/1819; H04L 1/1822; H04L 1/1825; H04L 1/1861; H04L 1/1893; H04L 1/0001; H04L 5/00; H04L 5/0053; H04W 72/04; H04W 72/12; H04W 16/00; H04W 36/06; H04B 7/024
See application file for complete search history.

(56) References Cited

U.S. PATENT DOCUMENTS

2022/0385411 A1* 12/2022 Lei .................. H04L 1/1812
2023/0046263 A1*  2/2023 Wong ............... H04W 72/569

OTHER PUBLICATIONS

Sony: "Considerations on HARQ-ACK enhancements for URLLC", Jan. 25-Feb, 5, 2021, 3GPP TSG RAN WG1 #104-e, 7 pages. (Year: 2021).*
Lenovo, Motorola Mobility: "HARQ-ACK feedback enhancement for IIoT/URLLC", 20210125-20210205, 3GPP Tsg Ran WG1 #104-e, 5 pages. (Year: 2021).*
International Search Report and Written Opinion—PCT/US2022/016827—ISA/EPO—dated May 9, 2022.

(Continued)

*Primary Examiner* — Ian N Moore
*Assistant Examiner* — Brian T Le
(74) *Attorney, Agent, or Firm* — Procopio, Cory, Hargreaves & Savitch LLP/QUALCOMM

(57) ABSTRACT

A method, a computer-readable medium, and an apparatus are provided for wireless communication at a user equipment (UE). The apparatus drops transmission of hybrid automatic repeat request-acknowledgment (HARQ-ACK) feedback for one or more downlink HARQ processes. The apparatus transmits, to a base station, a combined HARQ-ACK feedback triggered by the UE dropping a threshold amount of HARQ-ACK feedback, the combined HARQ-ACK feedback including dropped HARQ-ACK feedback for the one or more downlink HARQ processes.

30 Claims, 13 Drawing Sheets

(56) References Cited

OTHER PUBLICATIONS

Lenovo, et al., "HARQ-ACK Feedback Enhancement for IIoT/URLLC", Draft, 3GPPTSG RAN WG1 #104-e, R1-2100993, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25-Feb. 5, 2021, Jan. 19, 2021 (Jan. 19, 2021), XP051971328, 5 Pages, URL: https://ftp.3gpp.org/tsg_ran/WG1_RL1/SGR1_104-e/Docs/R1-2100993.zip, [Retrieved on Jan. 19, 2021] Section 1, p. 1-p. 2 Section 2.2, p. 3, section 2.

Sony: "Considerations on HARQ-ACK Enhancements for URLLC", Draft, 3GPP TSG RAN WG1 #104-e, R1-2100855, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25-Feb. 5, 2021, Jan. 19, 2021 (Jan. 19, 2021), XP051971207, 7 Pages, URL: https://ftp.3gpp.org/tsg_ran/WG1_RL1/TSGR1_104-e/Docs/R1-2100855.zip [Retrieved on Jan. 19, 2021] Section 2.1, pp. 2-3, figures 1,2 Section 2.5, pp. 5-6 Section 3, pp. 6-7.

\* cited by examiner

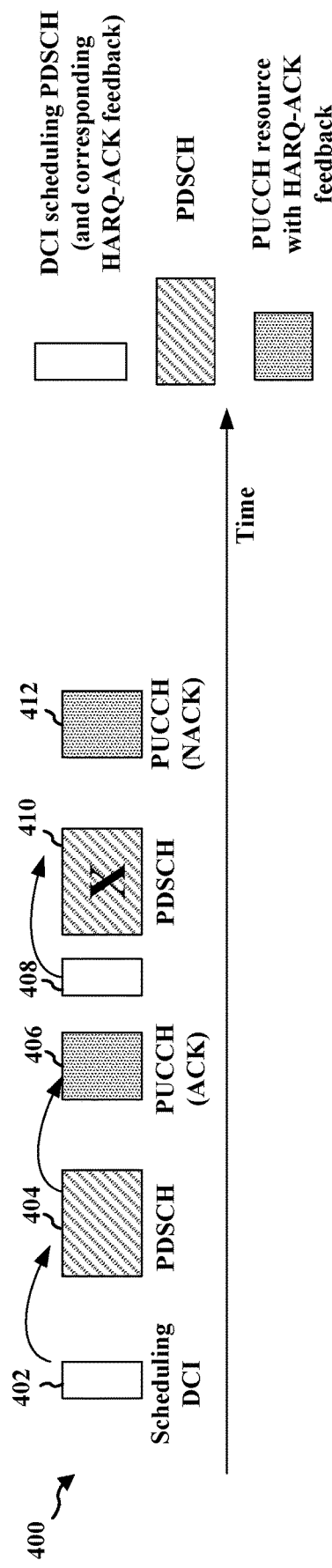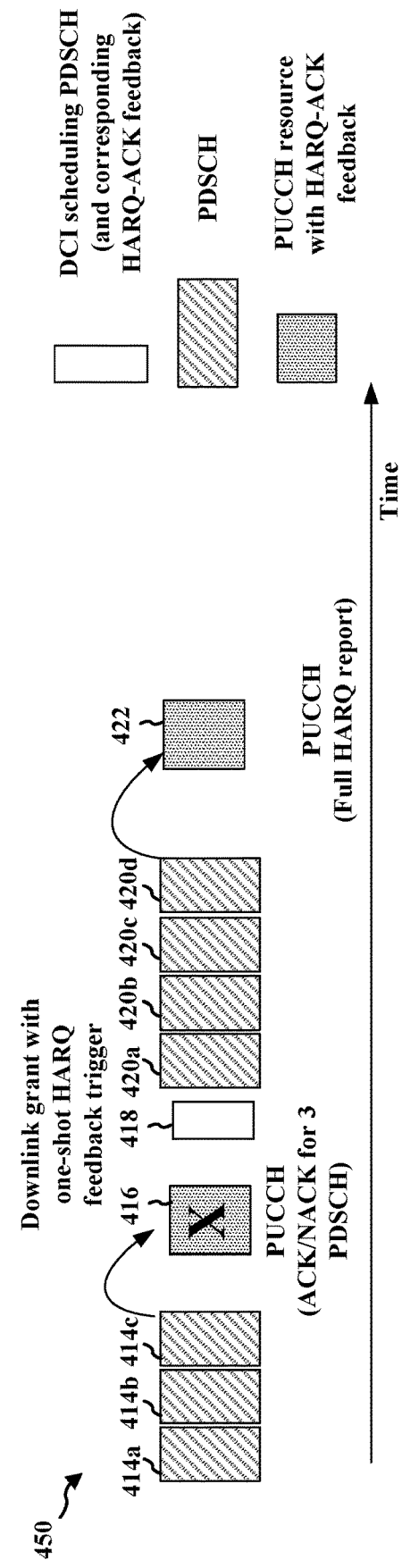
FIG. 4A
FIG. 4B

UE TRIGGERED ONE-SHOT HARQ-ACK FEEDBACK

BACKGROUND

Technical Field

The present disclosure relates generally to communication systems, and more particularly, to feedback for wireless communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus drops transmission of hybrid automatic repeat request-acknowledgment (HARQ-ACK) feedback for one or more downlink HARQ processes. The apparatus transmits, to a base station, a combined HARQ-ACK feedback triggered by the UE dropping a threshold amount of HARQ-ACK feedback, the combined HARQ-ACK feedback including dropped HARQ-ACK feedback for the one or more downlink HARQ processes.

In another aspect of the disclosure, a method, a computer-readable medium, and an apparatus are provided for wireless communication at a base station. The apparatus transmits, to a UE, physical downlink shared channel (PDSCH) transmissions for one or more hybrid automatic repeat request (HARQ) processes. The apparatus receives, from the UE, a combined HARQ-ACK feedback triggered at the UE based on a threshold amount of dropped HARQ-ACK feedback, the combined HARQ-ACK feedback including the dropped HARQ-ACK feedback for one or more downlink HARQ processes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A illustrates example aspects of HARQ-ACK feedback.

FIG. 4B illustrates example aspects of type-3 HARQ-ACK feedback.

DETAILED DESCRIPTION

Figure 1:
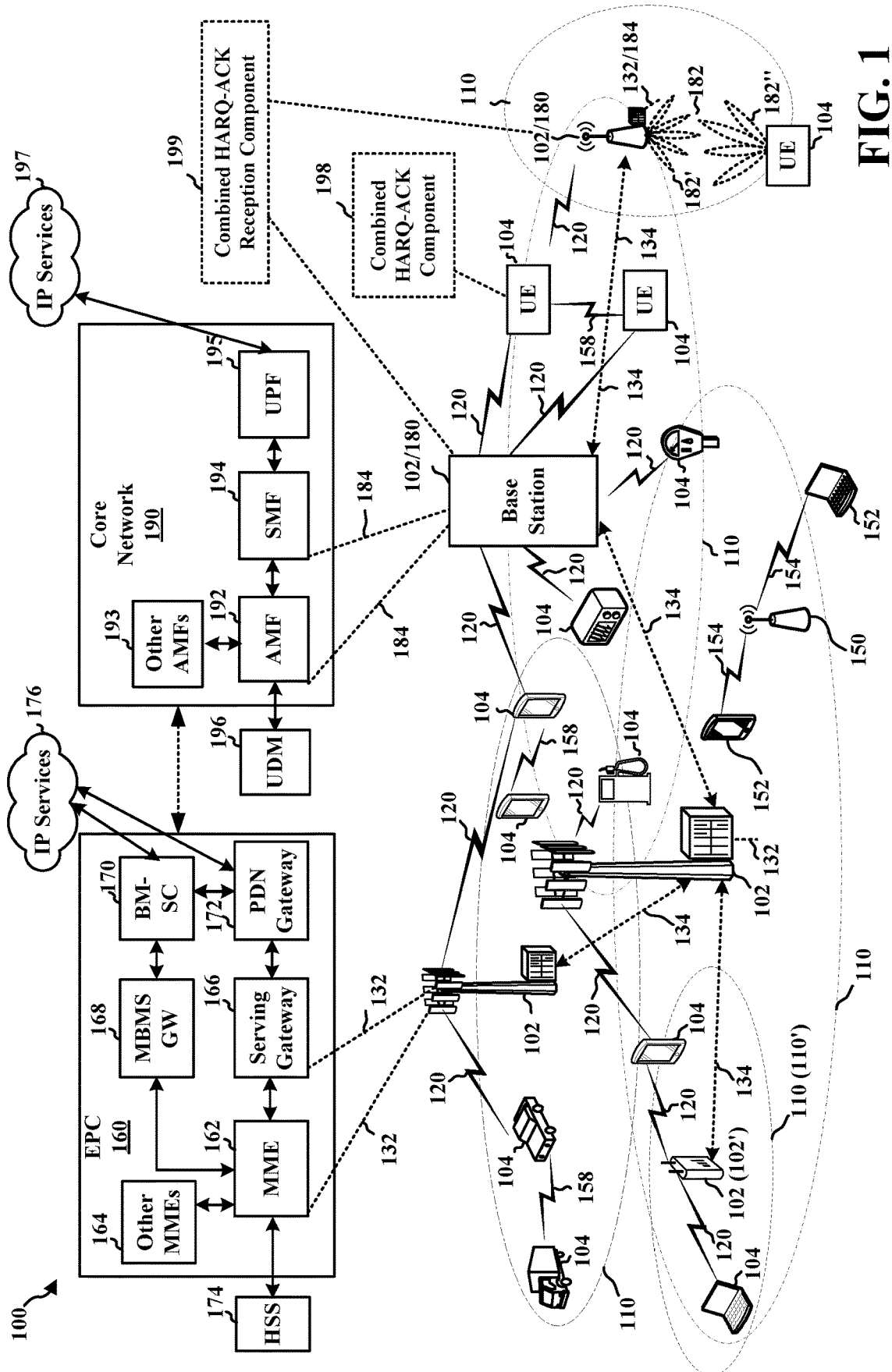
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

A UE may be scheduled to receive downlink transmissions from a base station, such as a physical downlink shared channel (PDSCH). For each PDSCH transmission, the UE may transmit HARQ-ACK feedback to the base station informing the base station whether or not the PDSCH transmission was accurately received. If the UE transmits a negative acknowledgment (NACK), the base station may retransmit the PDSCH transmission to the UE. The UE may transmit the HARQ-ACK feedback in an uplink resource, e.g., physical uplink control channel (PUCCH) resource, corresponding to the PDSCH. However, at times, the UE may skip transmission of the HARQ-ACK feedback. As an example, the HARQ-ACK feedback may be canceled due to a collision, e.g., overlap at least partially in time, with a higher priority uplink transmission from the UE. In this example, the UE may transmit the higher priority transmission and drop transmission of the colliding HARQ-ACK feedback. As another example, the resource for the HARQ-ACK feedback may conflict with resources for downlink reception, e.g., based on a periodic or semi-static downlink configuration. As another example, a UE may transmit the HARQ-ACK feedback on an unlicensed frequency spectrum and may perform a listen before talk (LBT) procedure in order to access the medium. If the LBT is unsuccessful, the UE may not transmit and may skip transmitting the HARQ-ACK feedback.

A base station may indicate for the UE to transmit combined feedback including the skipped or dropped HARQ-ACK feedback, e.g., in order to obtain skipped or failed feedback transmissions. The base station may transmit downlink control information (DCI) indicating for the UE to transmit one-shot HARQ-ACK feedback, which may also be referred to as Type 3 HARQ-ACK feedback. In response to receiving the DCI, the UE may combine HARQ-ACK feedback and transmit the one-shot (e.g., Type 3) HARQ-ACK feedback to the base station.

Aspects presented herein provide for a more efficient type of one-shot HARQ-ACK feedback that is event triggered and may be autonomously transmitted by the UE, e.g., without receiving DCI triggering the one-shot HARQ-ACK feedback. The event triggered, e.g., UE triggered, one-shot HARQ-ACK feedback may improve latency. The reduced latency may be helpful in time sensitive application, such as for URLLC.

FIG. 1 is a diagram illustrating an example of a wireless communications system and an access network 100 that includes base stations 102 and 180 and UEs 104. As described herein, a UE 104 may be configured to drop transmission of HARQ-ACK feedback for one or more downlink HARQ processes and may include a combined HARQ-ACK feedback component 198 configured to transmit, to a base station 102 or 180, a combined HARQ-ACK feedback triggered by the UE dropping a threshold amount of HARQ-ACK feedback. The combined HARQ-ACK feedback includes dropped HARQ-ACK feedback for the one or more downlink HARQ processes. The base station 102 or 180 may be configured to transmit, to the UE 104, PDSCH transmissions for one or more HARQ processes, and may include a combined HARQ-ACK reception component 199 configured to receive, from the UE 104, a combined HARQ-ACK feedback triggered at the UE based on a threshold amount of dropped HARQ-ACK feedback.

Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102/180, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
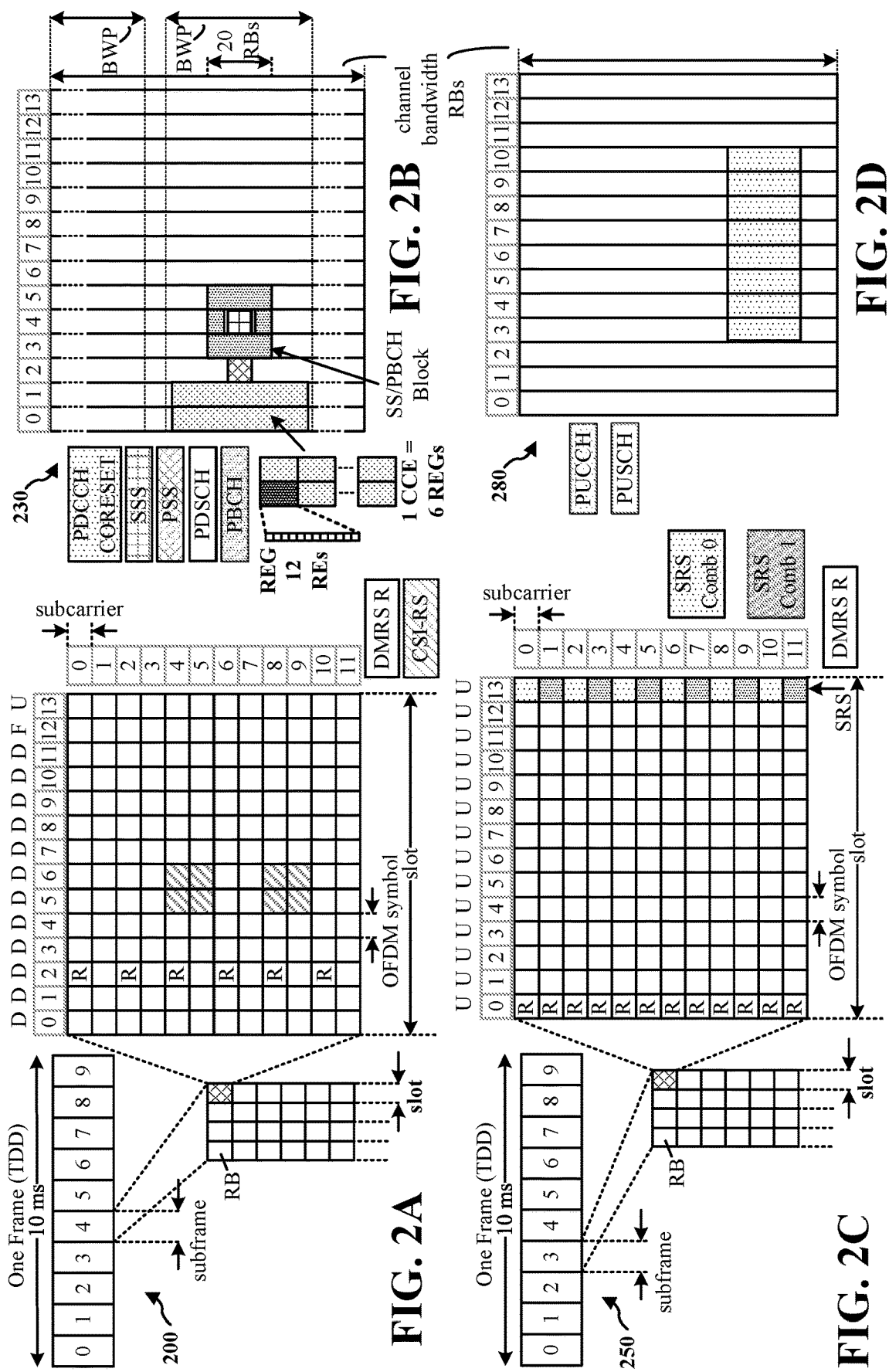
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK)

information (ACK/negative ACK (NACK)) feedback. The PUSCH carries data, and may additionally be used to carry a buffer status report (BSR), a power headroom report (PHR), and/or UCI.

Figure 3:
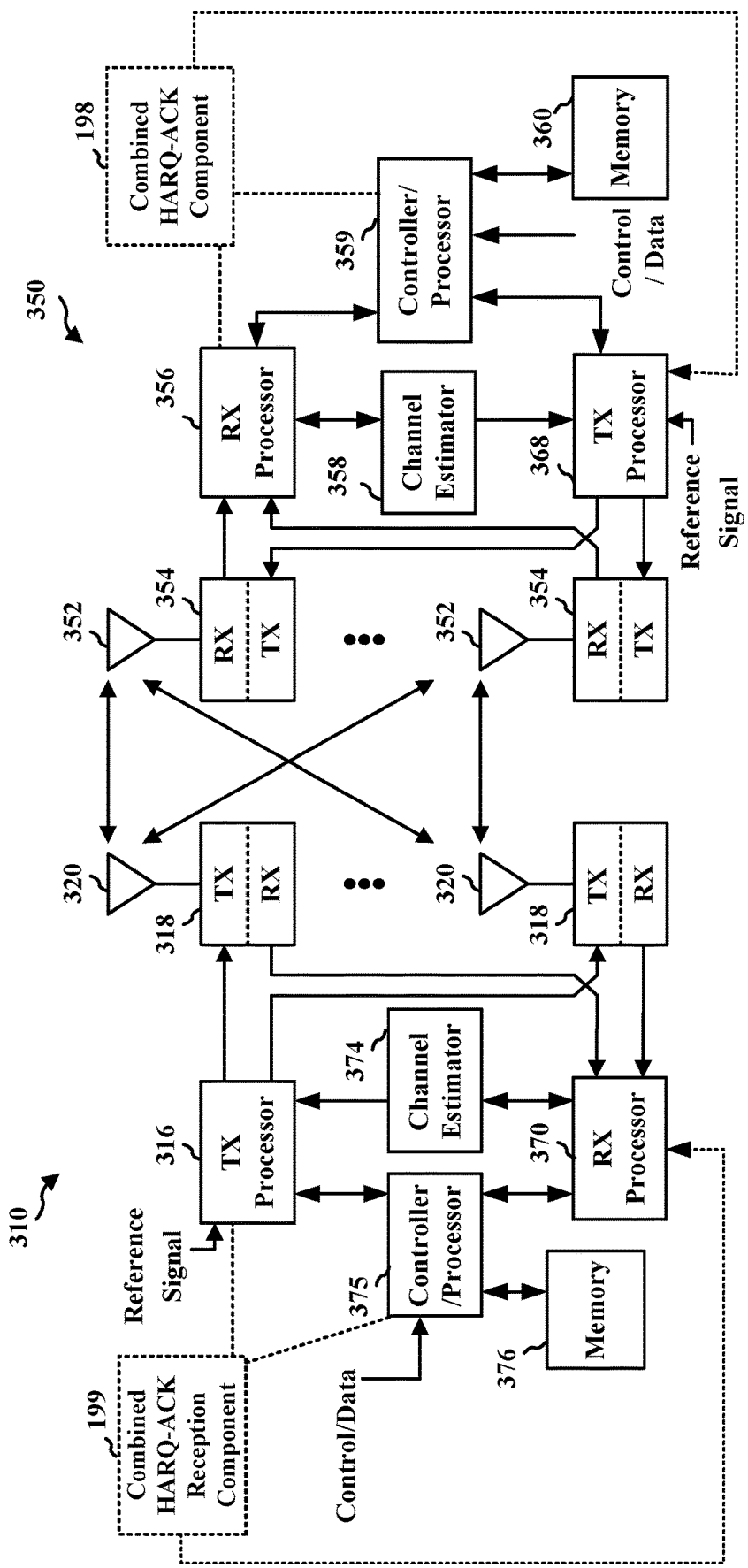
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the combined HARQ-ACK feedback component 198 of FIG. 1.

At least one of the TX processor 316, the RX processor 370, and the controller/processor 375 may be configured to perform aspects in connection with the combined HARQ-ACK feedback reception component 199 of FIG. 1.

A UE may be scheduled to receive downlink transmissions from a base station, such as a PDSCH. For each PDSCH transmission, the UE may transmit HARQ-ACK feedback to the base station informing the base station whether or not the PDSCH transmission was accurately received. FIG. 4A illustrates an example time diagram 400 showing a DCI 402 and 408 scheduling PDSCH 404 and 410 respectively for the UE and corresponding PUCCH resources 406 and 412 for the UE to transmit HARQ-ACK feedback about the PDSCH 404 and 410, respectively. FIG. 4A illustrates accurate reception of the PDSCH 404, which may lead the UE to transmit an ACK at 406. FIG. 4A illustrates with an "X" that the UE does not receive the PDSCH 410, which may lead the UE to transmit a NACK in the PUCCH resources 412. If the UE transmits a NACK, the base station may retransmit the PDSCH transmission (e.g., 410) to the UE. The UE may transmit the HARQ-ACK feedback in an uplink resource, e.g., PUCCH resource, corresponding to the PDSCH.

However, at times, the UE may skip transmission of the HARQ-ACK feedback. FIG. 4B illustrates a time diagram 450 showing a mechanism in which a base station may request feedback from the UE as one-shot HARQ feedback, which may also be referred to as Type-3 HARQ feedback. In FIG. 4B, the UE is scheduled for PDSCH transmissions 414a, 414b, 414c and a PUCCH resources 416 for HARQ-ACK feedback for the PDSCH transmissions 414a, 414b, 414c. As illustrated in FIG. 4B, the UE may skip transmission of the HARQ-ACK feedback at 416. At 418, the UE may receive DCI from the base station indicating for the UE to provide Type-3, one-shot HARQ-ACK feedback at PUCCH resource 422. At 422, the UE may transmit type-3 HARQ-ACK feedback, e.g., including HARQ-ACK feedback for PDSCH 414a, 414b, 414c and 420a, 420b, 420c, and 420d. In the Type-3 HARQ feedback, at 422, the UE may transmit HARQ-ACK feedback that was skipped at 416, as well as HARQ-ACK feedback that was not skipped, such as for 420a-d. The type-3 HARQ ACK feedback may be referred to herein as "one-shot HARQ-ACK feedback" or a "full HARQ report," and may be based on a HARQ-ACK codebook containing HARQ-ACK feedback corresponding to all downlink HARQ processes for all component carriers (CCs) configured for the UE in a PUCCH group. In some examples, the DCI 418 triggering the type-3 HARQ-ACK feedback may be a particular format of DCI, such as DCI format 1_1. In some aspects, the DCI 418 may trigger the type-3 HARQ feedback, at 422, without scheduling an associated PDSCH. Thus, the base station may indicate for the UE to transmit combined feedback including the skipped or dropped HARQ-ACK feedback, e.g., in order to obtain skipped or failed feedback transmissions. In response to receiving the DCI 418, the UE may combine HARQ-ACK feedback and transmit the one-shot (e.g., Type 3) HARQ-ACK feedback to the base station.

Aspects presented herein provide for a more efficient type of one-shot HARQ-ACK feedback that is event triggered and may be autonomously transmitted by the UE, e.g., without receiving DCI 418 triggering the one-shot HARQ-ACK feedback 422 in FIG. 4B. The event triggered, e.g., UE triggered, one-shot HARQ-ACK feedback may improve latency for communication with the UE. The reduced latency may be helpful in time sensitive application, such as for URLLC. For example, in URLLC, it may take too long for the UE to wait for the base station to request a type-3 HARQ-ACK feedback before providing the skipped HARQ-ACK information to the UE so that the base station can provide a retransmission to the UE.

Figure 5:
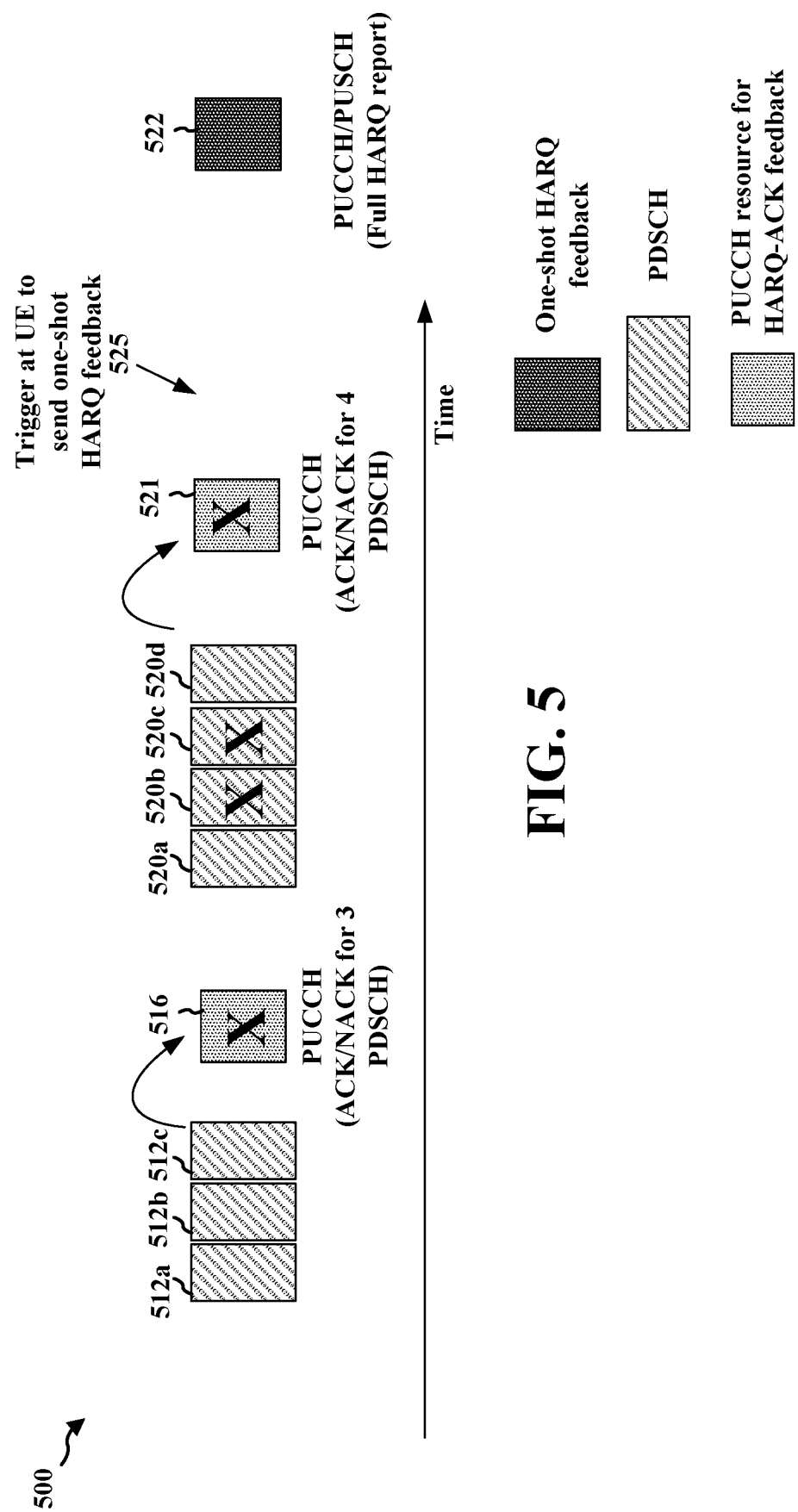
FIG. 5 illustrate example aspects of event triggered type-3 HARQ-ACK feedback.

FIG. 5 illustrates an example time diagram 500 of event triggered Type-3 HARQ ACK feedback according to the aspects presented herein. In FIG. 5, similar to FIG. 4, the UE is scheduled to receive PDSCH 512a, 512b, 512c and has a corresponding PUCCH resource 516 to transmit the ACK/NACK information for the PDSCH 512a-c. In FIG. 5, the UE may drop the transmission of the HARQ-ACK at 516, e.g., in response to a colliding transmission, a conflicting downlink reception, a failure to pass LBT, etc., such as described in connection with FIGS. 6A-6C. FIG. 5 also illustrates that the UE may be scheduled to receive PDSCH 520a, 520b, 520c, 520d and with a corresponding PUCCH resource 521 to transmit ACK/NACK information for the PDSCH 520a-d. However, in FIG. 5, the UE may skip sending the HARQ-ACK feedback at PUCCH resource 521, similar to 516. As illustrated at 525, the skipped HARQ-ACK feedback (at 516 and/or 521) may constitute an occurrence of an event that triggers the UE to transmit type-3 HARQ-ACK feedback at 522. The resources at 522 may be PUCCH resources or PUSCH resources. As the UE is triggered to send the HARQ-ACK feedback without a DCI from the base station requesting the type-3 HARQ-ACK feedback, the UE may not have a corresponding allocation of a PUCCH resource. The UE may multiplex the type-3 HARQ-ACK feedback in PUSCH transmission in some aspects.

Figure 6A:
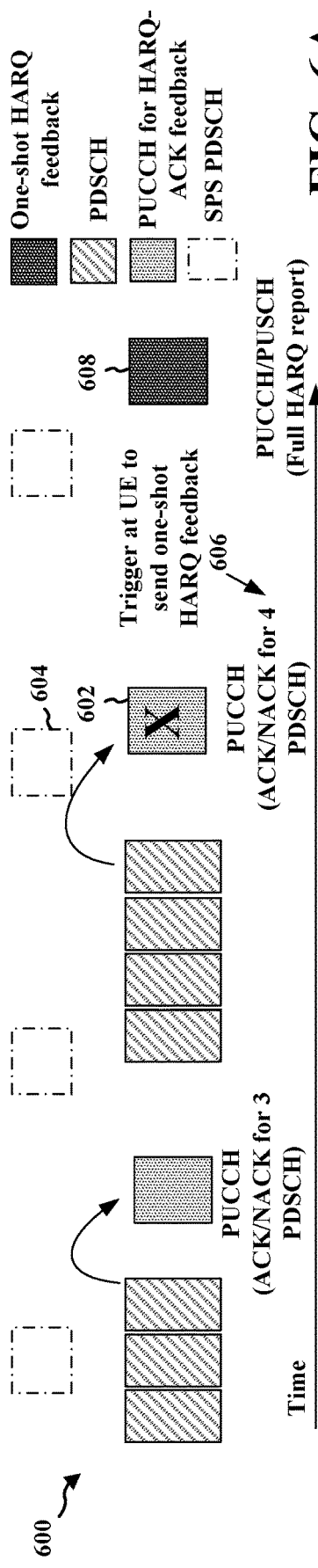
FIGS. 6A-6C illustrate example aspects of dropping HARQ-ACK feedback and triggering type-3 HARQ-ACK feedback.
Figure 6B:
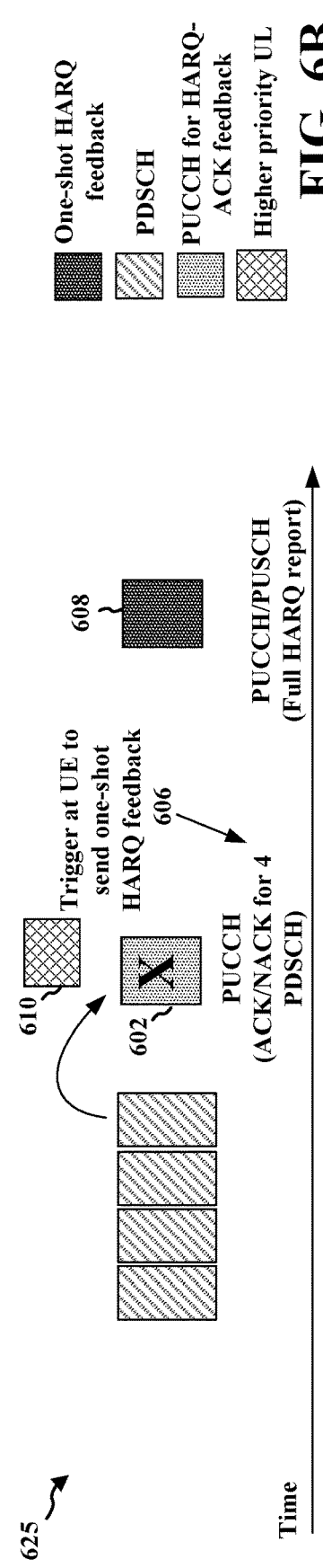
Figure 6C:
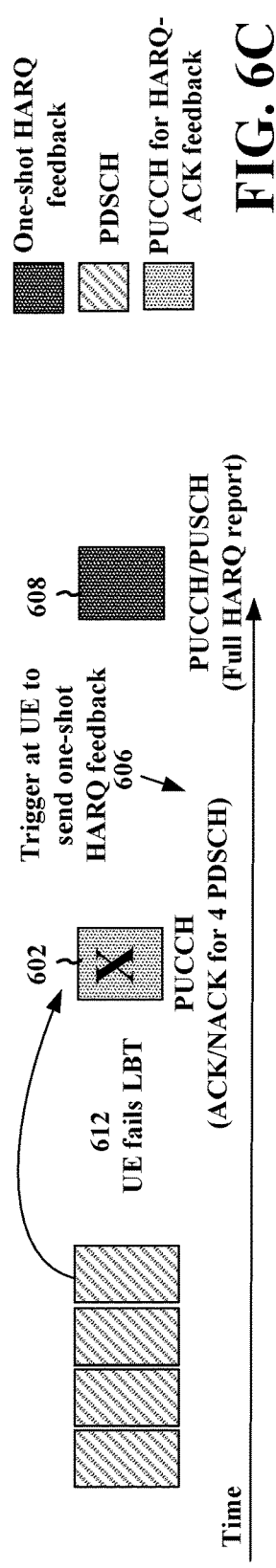

FIGS. 6A-6C illustrate examples that may lead to a skipped HARQ-ACK feedback transmission. FIG. 6A illustrates an example 600 in which the UE may skip transmission of the HARQ-ACK information in PUCCH resource 602 based on a conflict, e.g., an overlap in time, with a resource 604 for downlink reception. Based on a trigger at the UE, at 606, the UE may transmit type-3 HARQ-ACK feedback at 608, as described herein. As illustrated in FIG. 6A, the downlink resource may be a periodic based on a semi-static downlink configuration, e.g., semi-persistent scheduling (SPS). The UE may cancel, skip, or otherwise drop transmission of HARQ-ACK feedback at 602 due to a collision, e.g., at least a partial overlap in time, with an SPS PDSCH.

FIG. 6B illustrates an example 625 showing the HARQ-ACK feedback being canceled at 602 due to a collision, e.g., at least a partial overlap in time, with a resource 610 of a higher priority uplink transmission from the UE. In this example, the UE may transmit the higher priority transmission, at 610, and drop transmission of the colliding HARQ-ACK feedback, at 602. Based on a trigger at the UE, at 606, the UE may transmit type-3 HARQ-ACK feedback at 608, as described herein.

FIG. 6C illustrates another example 650, in which the UE drops the transmission of the HARQ-ACK feedback at 602 based on an LBT failure, at 612. In some aspects, the UE may transmit the HARQ-ACK feedback on an unlicensed frequency spectrum and may perform an LBT procedure in order to access the medium. If the LBT procedure is unsuccessful, the UE may refrain from transmitting and may skip transmitting the HARQ-ACK feedback, at 602. Based on a trigger at the UE, at 606, the UE may transmit type-3 HARQ-ACK feedback at 608, as described herein.

In some aspects, the event 606 that triggers the UE to transmit the type-3 HARQ-ACK feedback, e.g., without receiving a DCI trigger from a base station, may be based on a number of dropped HARQ-ACK bits exceeding a threshold number of bits. In some aspects, the threshold may be 0 bits, which may lead the UE to transmit the type-3 HARQ-ACK feedback each time HARQ-ACK feedback of at least one bit is skipped. In some aspects, the threshold may be 1 or more bits. The UE may receive a configuration of a threshold number of bits from a base station.

Figure 7:
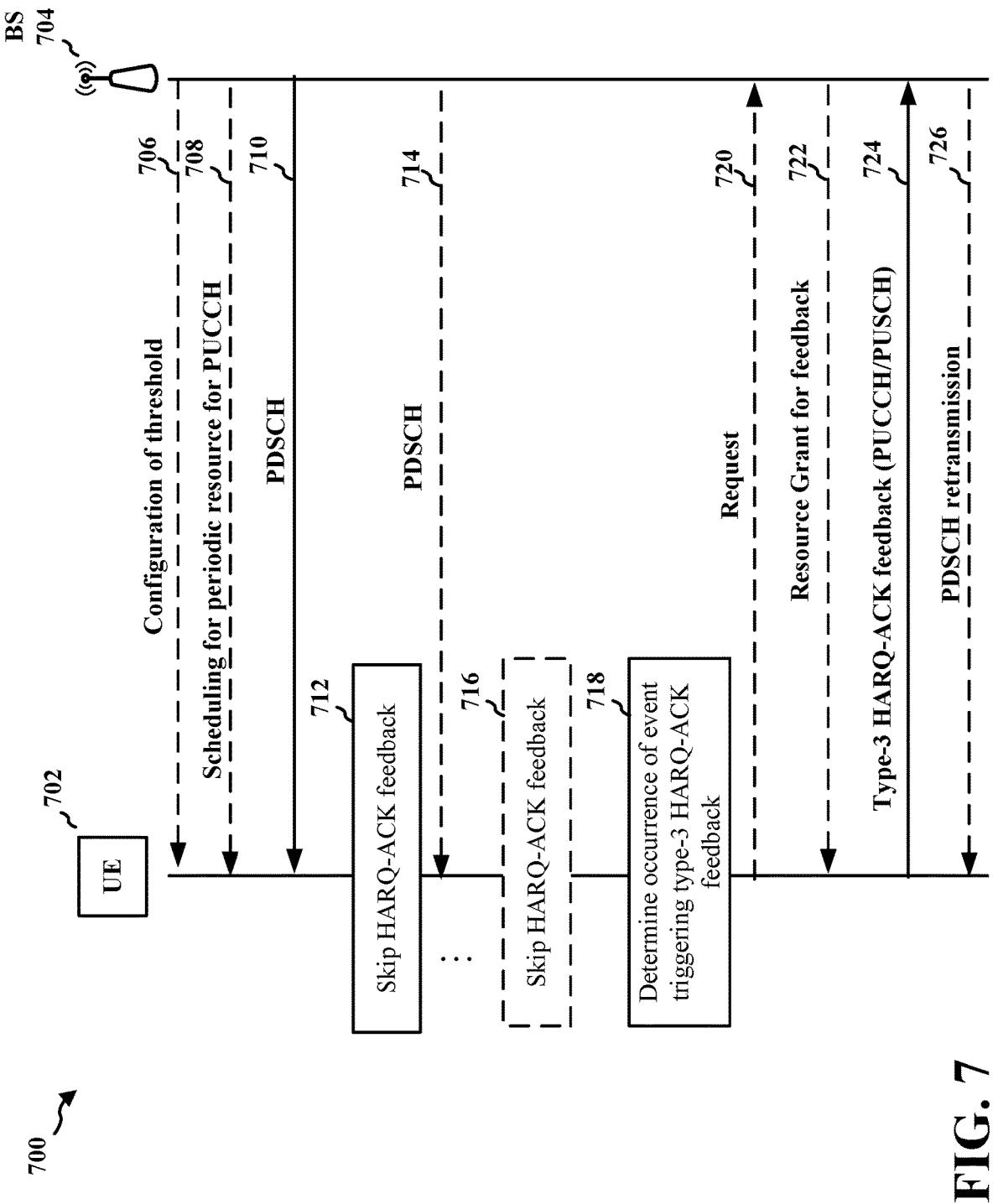
FIG. 7 is a communication flow diagram between a UE and a base station including event triggered type-3 HARQ-ACK feedback.

FIG. 7 illustrates an example communication flow 700 between a UE 702 and a base station 704 including event triggered type-3 HARQ-ACK feedback, and shows at 706, that the base station may configure a threshold for the UE to use in determining whether an event has occurred that triggers type-3 HARQ-ACK feedback. Optional aspects are illustrated with a dashed line. The base station 704 may configure different thresholds for the HARQ-ACK feedback that is canceled due to different reasons. For example, the base station 704 may configure a first threshold for HARQ-ACK canceled due to an intra-UE prioritization, such as described in connection with FIG. 6B. The base station 704 may configure a second threshold for HARQ-ACK feedback that is canceled due to a conflict with downlink resources (e.g., downlink symbols) such as described in connection with FIG. 6A. The base station may configure a third threshold for HARQ-ACK feedback that is canceled due to an LBT failure. The base station may configure different thresholds for HARQ-ACK of different priorities. For example, the base station 704 may configure a lower threshold (e.g., 0 bits) for the cancelation of higher priority HARQ-ACK feedback and may configure a higher threshold (e.g., multiple bits) for the cancelation of lower priority HARQ-ACK feedback.

In some aspects, the threshold may be based on a number of dropped feedback. In some aspects, the threshold may be further based on content of the dropped feedback. For example, the base station 704 may configure a first threshold number of dropped ACKs that triggers transmission of the type-3 HARQ-ACK feedback and may configure a second threshold number of dropped NACKs that triggers transmission of the type-3 HARQ-ACK feedback. In some aspects, the first threshold may be lower than the second threshold. A base station may treat dropped ACK/NACK feedback as a NACK in order to avoid missing retransmissions for PDSCH that the UE did not receive, and the second threshold for dropped NACKs may be higher than the first threshold for the number of dropped ACKs. In some aspects, the UE may receive a single threshold for a number of dropped ACKs, and may apply an infinite threshold for the dropped number of NACKs so that the UE does not trigger type-3 HARQ-ACK feedback based on dropped NACKs. In some aspects, the first threshold may be the same as the second threshold. In some aspects, the first threshold may be higher than the second threshold.

As illustrated at 710, the base station 704 transmits PDSCH to the UE 702. At 712, the UE skips transmitting HARQ-ACK feedback, e.g., based on any of the aspects described in connection with FIGS. 6A-6C. The base station 704 may transmit additional PDSCH 714, and the UE 702 may skip transmission of additional HARQ-ACK, at 716. The skipped HARQ-ACK may occur any number of times, as shown in FIG. 7.

At 718, the UE 702 determines an occurrence of an event triggering the UE to transmit type-3 HARQ-ACK feedback (e.g., one-shot HARQ-ACK feedback or a full HARQ-ACK report). The event may be that the UE has dropped the threshold number of HARQ-ACK bits, e.g., at 712, 714, etc., or that the UE has dropped a threshold number of instances of HARQ-ACK feedback, a threshold number of HARQ-ACK transmissions, etc. The event may be that the UE has dropped a threshold number of ACKs, a threshold number of NACKs, a threshold amount of HARQ-ACK feedback due to a conflict with an uplink transmission, a threshold amount of HARQ-ACK feedback due to a conflict with downlink reception, a threshold amount of HARQ-ACK feedback due to an LBT failure, and/or a threshold amount of HARQ-ACK feedback of a particular priority level, etc.

Figure 8:
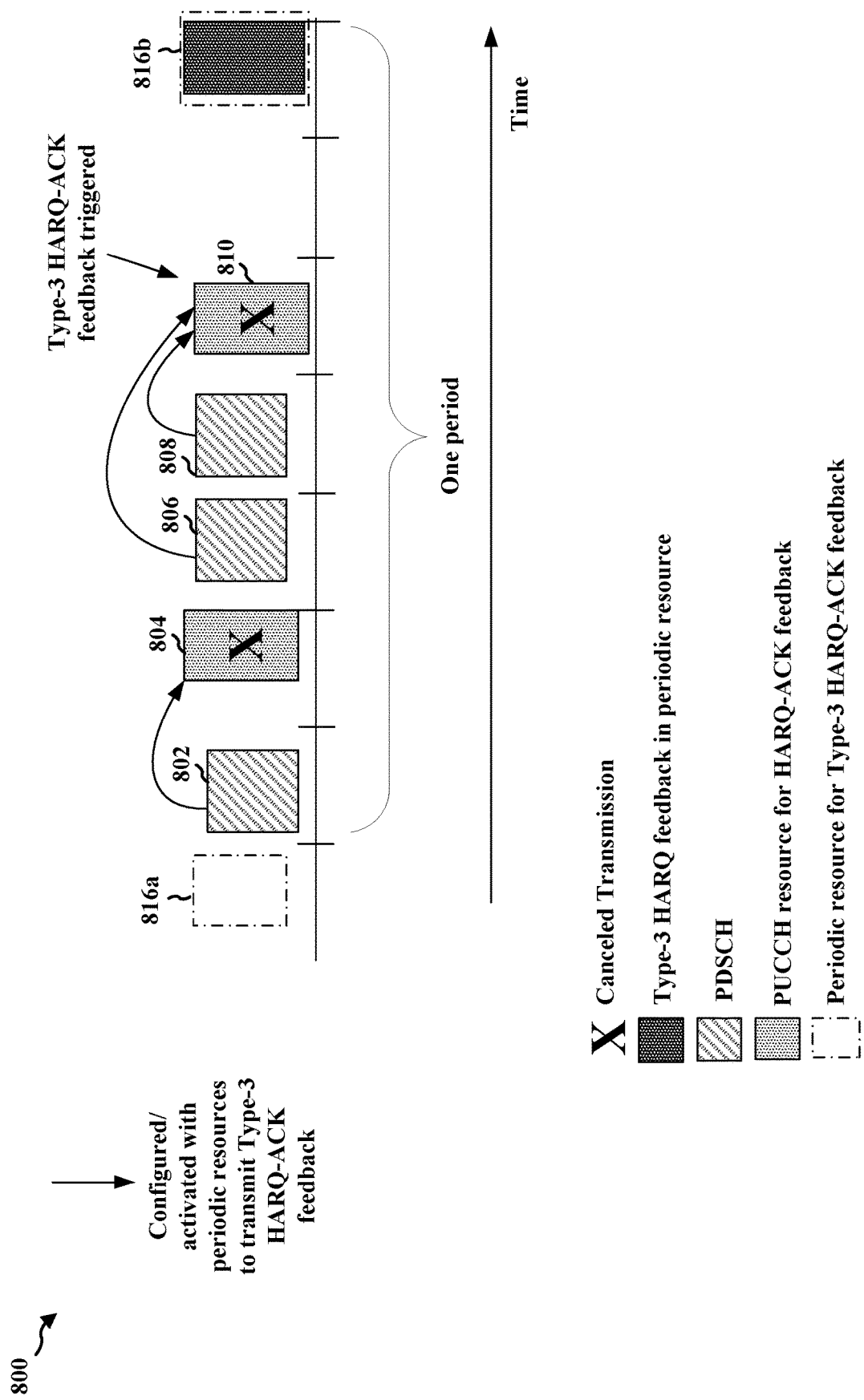
FIG. 8 is a time diagram illustrating example aspects of type-3 HARQ-ACK feedback.

FIG. 8 illustrates an example time diagram 800 showing the trigger of type-3 HARQ-Ack feedback 822 that is transmitted in an instance 816b of periodic PUCCH/PUSCH resources that are scheduled for the UE by the base station, upon the triggering condition being met. For example, in the occasion 816a, the UE does not transmit the type-3 HARQ-ACK feedback based on the triggering condition not being met. FIG. 8 illustrates an example in which the PUCCH 804 with ACK/NACK information for a single PDSCH 802 is not transmitted, as shown by the "X." The transmission of the PUCCH 804 may be canceled in response to any of the reasons described in connection with FIGS. 6A-6C, for example. FIG. 8 also illustrates that the PUCCH 810 for two PDSCH 806, 808 is also skipped, the combination of the dropped PUCCH at 804 and 810 triggering the type-3 HARQ-ACK feedback that is transmitted in the next periodic occasion 816b. FIG. 8 illustrates that a period, e.g., for counting dropped HARQ-ACK feedback and for combining HARQ-ACK feedback may extend between occasions 816a, 816b of the periodic resources configured for the type-3 HARQ-ACK feedback.

In response to determining the occurrence of the event, at 718, the UE 702 transmits the type-3 HARQ-ACK feedback 724 to the base station 704. The type-3 HARQ-ACK feedback may include any of the aspects described in connection with any of FIG. 4B, 5, or 6A-6C. The type-3 HARQ-ACK feedback may include the skipped feedback corresponding to 712, 714, etc., and may further include HARQ-ACK feedback that was not skipped. The UE may transmit the type-3 HARQ-ACK feedback on PUCCH or PUSCH resources. For example, the UE may multiplex the type-3 HARQ-ACK feedback with a PUSCH transmission, e.g., based on one or more multiplexing rules. In some aspects, the rules may be similar to multiplexing rules for other types of HARQ-ACK feedback.

In some aspects, the base station 704 may schedule the UE 702, at 708, with periodic or semi-persistent resources for PUCCH/PUSCH occasions to transmit the type-3 HARQ-ACK. The base station may also configure a periodicity for the UE to report skipped HARQ-ACK feedback. The base station 704 may schedule the resources for the UE via one or more of RRC configuration, MAC-CE, and/or DCI. For example, the base station 704 may RRC configure the UE 702 with semi-persistent scheduling (SPS) resources that the base station may activate via a MAC-CE or DCI. The UE 702 may transmit the type-3 HARQ-ACK feedback, at 724, using an instance of the periodic/semi-persistent resources scheduled at 708.

In other aspects, the UE may transmit a request 720 to the base station 704 for resources to transmit the type-3 HARQ-ACK feedback, and may receive a resource grant 722 from the base station 704 for transmitting the type-3 HARQ-ACK feedback 724. The UE 702 may transmit the type-3 HARQ-ACK feedback, at 724, using the resource allocated at 722.

Figure 9:
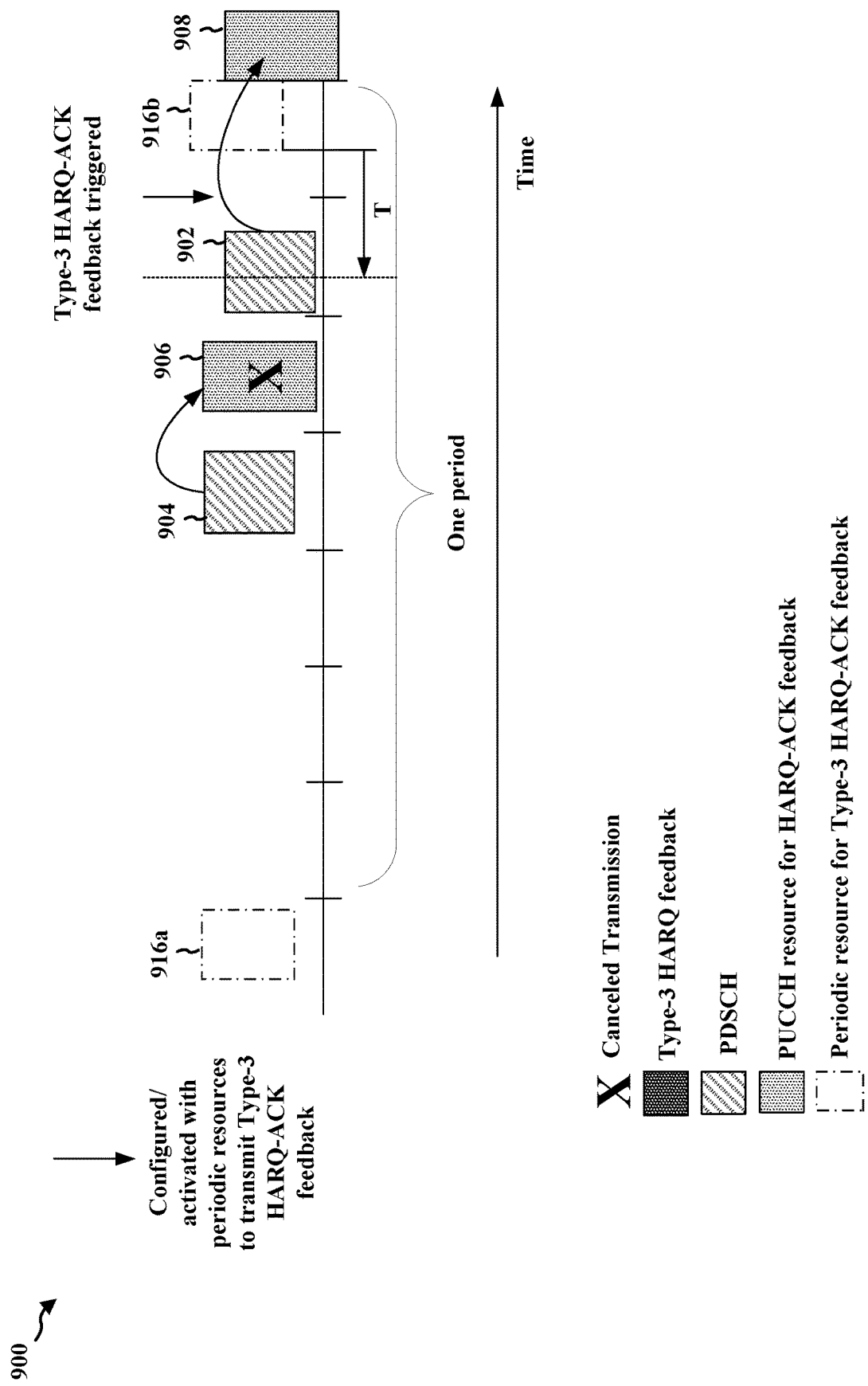
FIG. 9 is a time diagram illustrating example aspects of counting and combining HARQ-ACK feedback.

In some aspects, when reporting the type-3 HARQ-ACK feedback 724, triggered autonomously at 718, the UE may include and/or count the HARQ-ACK bits that correspond to PDSCH(s) that end a threshold amount of time before the start of the PUCCH/PUSCH resources in which the type-3 HARQ-ACK feedback will be transmitted. For example, when counting dropped HARQ-ACK feedback and comparing it to a threshold in order to determine whether to trigger the type-3 HARQ-ACK feedback, the UE may count the HARQ-ACK bits that correspond to PDSCH(s) that end a threshold amount of time before the start of the PUCCH/PUSCH resources in which the type-3 HARQ-ACK feedback will be transmitted. Similarly, once type-3 HARQ-ACK feedback has been triggered, the UE may include in the triggered feedback the HARQ-ACK bits that correspond to PDSCH(s) that end a threshold amount of time before the start of the PUCCH/PUSCH resources in which the type-3 HARQ-ACK feedback will be transmitted. FIG. 9 illustrates an example time diagram 900 showing a period that extends between a first periodic/semi-static PUCCH/PUSCH resource 916a allocated in advance for the type-3 HARQ-ACK feedback and a subsequent resource 916b allocated in advance for the type-3 HARQ-ACK feedback. FIG. 9 illustrates a threshold amount of time T prior to the beginning of the PUCCH/PUSCH resource 916b for the type-3 HARQ-ACK feedback. Based on the threshold T, the UE would not count (when determining whether a threshold is met in order to trigger the type-3 HARQ-ACK feedback), or include in the triggered type-3 HARQ-ACK feedback, HARQ-ACK feedback for the PDSCH 902 because the PDSCH 902 does not end at least T before the resource 916b. The HARQ-ACK feedback 906, for the PDSCH 904 would be counted/included because the PDSCH 904 ends prior to the threshold T.

In some aspects, T may be based on $N_1$ symbols or $T_{proc, 1}$ from a UE PDSCH processing procedure timeline, e.g., which may be based on aspects in Table 1 for PDSCH processing capability 1 or Table 2 for PDSCH processing capability 2, as shown below. In some aspects, T may be based on $N_2$ symbols or $T_{proc, 2}$ from a UE PDSCH processing procedure timeline, e.g., which may be based on aspects in Table 3 for PUSCH preparation time for PUSCH timing capability 1 or Table 4 for PUSCH preparation time for PUSCH timing capability 2, as shown below.

TABLE 1

| | PDSCH decoding time $N_1$ [symbols] | |
|---|---|---|
| μ | dmrs-AdditionalPosition = pos0 in DMRS-DownlinkConfig in both of dmrs-DownlinkForPDSCH-MappingTypeA and dmrs-DownlinkForPDSCH-MappingTypeB | dmrs-AdditionalPosition ≠ pos0 in DMRS-DownlinkConfig in either of dmrs-DownlinkForPDSCH-MappingTypeA and dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

TABLE 2

| μ | PDSCH decoding time $N_1$ [symbols] dmrs-AdditionalPosition = pos0 in DMRS-DownlinkConfig in both of dmrs-DownlinkForPDSCH-MappingTypeA and dmrs-DownlinkForPDSCH-MappingTypeB |
|---|---|
| 0 | 3 |
| 1 | 4.5 |
| 2 | 9 for frequency range 1 |

TABLE 3

| μ | PUSCH preparation time $N_2$ [symbols] |
|---|---|
| 0 | 10 |
| 1 | 12 |
| 2 | 23 |
| 3 | 36 |

TABLE 4

| μ | PUSCH preparation time $N_2$ [symbols] |
|---|---|
| 0 | 5 |
| 1 | 5.5 |
| 2 | 11 for frequency range 1 |

In some aspects, when reporting the type-3 HARQ-ACK feedback 724, triggered autonomously at 718, the UE may include and/or count the HARQ-ACK bits for HARQ-ACK feedback that starts before the start of the PUCCH/PUSCH resources in which the type-3 HARQ-ACK feedback will be transmitted. For example, when counting dropped HARQ-ACK feedback and comparing it to a threshold in order to determine whether to trigger the type-3 HARQ-ACK feedback, the UE may count the HARQ-ACK bits that correspond to PDSCH(s) that start before the PUCCH/PUSCH resources in which the type-3 HARQ-ACK feedback will be transmitted. Similarly, once type-3 HARQ-ACK feedback has been triggered, the UE may include in the triggered feedback the HARQ-ACK bits that correspond to PDSCH(s) that start before the PUCCH/PUSCH resources in which the type-3 HARQ-ACK feedback will be transmitted. In FIG. 9, the HARQ-ACK bits, for 906, may be counted/included for the potential type-3 HARQ-ACK feedback in 916b. However, the HARQ-ACK bits, for 908, would not, because 908 does not start before 916b.

In some aspects, when reporting the type-3 HARQ-ACK feedback 724, triggered autonomously at 718, the UE may include and/or count the HARQ-ACK bits for HARQ-ACK feedback that ends before the start of the PUCCH/PUSCH resources in which the type-3 HARQ-ACK feedback will be transmitted. For example, when counting dropped HARQ-ACK feedback and comparing it to a threshold in order to determine whether to trigger the type-3 HARQ-ACK feedback, the UE may count the HARQ-ACK bits that correspond to PDSCH(s) that end before the start of the PUCCH/PUSCH resources in which the type-3 HARQ-ACK feedback will be transmitted. Similarly, once type-3 HARQ-ACK feedback has been triggered, the UE may include in the triggered feedback the HARQ-ACK bits that correspond to PDSCH(s) that end before the start of the PUCCH/PUSCH resources in which the type-3 HARQ-ACK feedback will be transmitted. In FIG. 9, the HARQ-ACK bits, for 906, may be counted/included for the potential type-3 HARQ-ACK feedback in 916b. However, the HARQ-ACK bits, for 908, would not, because 908 does not end before 916b.

In some aspects, when reporting the type-3 HARQ-ACK feedback 724, triggered autonomously at 718, the UE may include and/or count the HARQ-ACK bits for HARQ-ACK feedback that are canceled a threshold amount of time (e.g., T) before the start of the PUCCH/PUSCH resources in which the type-3 HARQ-ACK feedback will be transmitted. For example, when counting dropped HARQ-ACK feedback and comparing it to a threshold in order to determine whether to trigger the type-3 HARQ-ACK feedback, the UE may count the HARQ-ACK bits that are canceled a threshold amount of time (e.g., T) before the start of the PUCCH/PUSCH resources in which the type-3 HARQ-ACK feedback will be transmitted. Similarly, once type-3 HARQ-ACK feedback has been triggered, the UE may include in the triggered feedback the HARQ-ACK bits that correspond to PDSCH(s) that are canceled a threshold amount of time (e.g., T) before the start of the PUCCH/PUSCH resources in which the type-3 HARQ-ACK feedback will be transmitted. The time at which a particular HARQ-ACK transmission is considered to be cancelled may depend on the reason for cancelling the HARQ-ACK. In a case of overlapping with a higher priority uplink transmission, the HARQ-ACK may be considered to be "cancelled," for the purpose of determining whether a type-3 HARQ-ack feedback threshold is met, at the end of the grant that schedules the higher priority uplink transmission. In a case of overlapping with downlink symbols (e.g., due to a semi-static TDD configuration), the time at which the HARQ-ACK is considered to be canceled may be before the threshold time because the UE knows that the HARQ-ACK is to be cancelled once the UE receives the RRC parameters for the TDD configuration.

In some aspects, in response to one or more NACKs in the type-3 HARQ-ACK feedback 724, the base station 704 may retransmit PDSCH (e.g., 710, 714, etc.).

Figure 10:
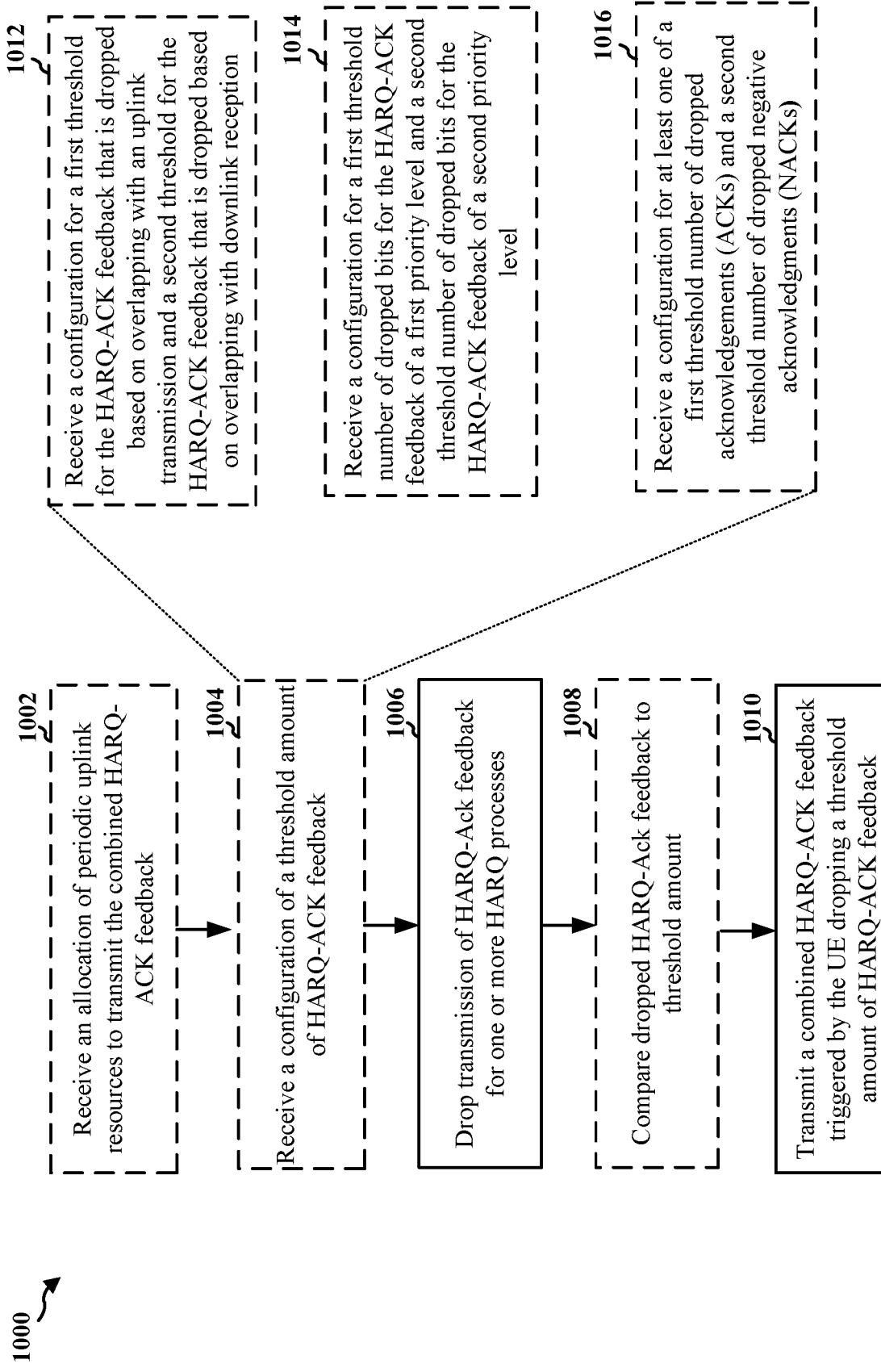
FIG. 10 is a flowchart of a method of wireless communication including the transmission of combined HARQ-ACK feedback.

FIG. 10 is a flowchart 1000 of a method of wireless communication. The method may be performed by a UE (e.g., the UE 104, 350, 702; the apparatus 1102). Optional aspects are illustrated with a dashed line. The method may enable the UE to provide skipped HARQ-ACK feedback in a more efficient manner by triggering autonomous transmission of type-3 HARQ-ACK feedback at the UE.

At 1006, the UE drops transmission of HARQ-ACK feedback for one or more downlink HARQ processes. FIG. 7 illustrates examples of a UE 702 dropping HARQ-ACK feedback. FIGS. 4A-6C illustrate additional aspects of a UE dropping HARQ-ACK feedback. The HARQ-ACK feedback may be dropped by the conflict component 1140 and/or the transmission component 1134 of the apparatus 1102, for example.

At 1010, the UE transmits, to a base station, a combined HARQ-ACK feedback triggered by the UE dropping a threshold amount of HARQ-ACK feedback, the combined HARQ-ACK feedback including dropped HARQ-ACK feedback for the one or more downlink HARQ processes. The combined HARQ-ACK feedback may also include non-dropped HARQ-ACK feedback. The combined HARQ-ACK feedback may comprise Type 3 HARQ-ACK feedback, which may be referred to as one-shot HARQ-ACK feedback or a full HARQ report. The transmission may be performed, e.g., by the combined HARQ-ACK component 1142 of the apparatus 1102 in FIG. 11.

As illustrated at 1004, the UE may receive, from the base station, a configuration of the threshold amount of the HARQ-ACK feedback. The reception of the configuration may be performed, e.g., by the configuration component 1144 of the apparatus 1102 via the reception component 1130. In some aspects, the threshold amount of HARQ-ACK feedback may comprise a threshold number of dropped HARQ-ACK bits. As illustrated at 1012, the UE may receive from the base station, a configuration for a first threshold for the HARQ-ACK feedback that is dropped based on overlapping with an uplink transmission and a second threshold for the HARQ-ACK feedback that is dropped based on overlapping with downlink reception. As illustrated at 1014, the UE may receive, from the base station, a configuration for a first threshold number of dropped bits for the HARQ-ACK feedback of a first priority level and a second threshold number of dropped bits for the HARQ-ACK feedback of a second priority level. In some aspects, the threshold amount of the HARQ-ACK feedback may be based on content of the HARQ-ACK feedback. As illustrated at 1016, the UE may receive, from the base station, a configuration for at least one of a first threshold number of dropped ACKs and a second threshold number of dropped NACKs.

In some aspects, the UE may receive an allocation of periodic uplink resources to transmit the combined HARQ-ACK feedback, at 1002, where the UE transmits the combined HARQ-ACK feedback, at 1010, in an instance of the periodic uplink resources. FIGS. 8 and 9 illustrate examples of periodic resources for a type-3 HARQ-ACK feedback. FIG. 7 illustrates the UE 702 receiving scheduling 708 for periodic resources for the transmission of the type-3 HARQ-ACK feedback. The reception of the allocation may be performed, e.g., by the resource component 1146 via the reception component 1130 of the apparatus 1102 in FIG. 11.

In other aspects, the UE may transmit an indication to the base station to request an uplink resource for transmitting the combined HARQ-ACK feedback and may receive a grant allocating the uplink resource for transmitting the combined HARQ-ACK feedback, where the UE transmits the combined HARQ-ACK feedback, at 1010, in the resources allocated in the grant. FIG. 7 illustrates an example of the UE 702 sending a request 720 for a resource for transmitting the combined HARQ-Ack feedback. The request and reception of the grant may be performed, e.g., by the resource component 1146 via the reception component 1130 and/or the transmission component 1134 of the apparatus 1102 in FIG. 11.

At 1008, the UE may compare the dropped HARQ-ACK feedback to the threshold amount. The comparison may be performed by the threshold component 1148 of the apparatus 1102 in FIG. 11. Various examples of comparison are described in connection with FIG. 9. For example, the UE may compare the dropped HARQ-ACK feedback corresponding to a physical PDSCH that ends a threshold amount of time before a beginning of an uplink resource for the combined HARQ-ACK feedback, where the UE transmits the combined HARQ-ACK feedback, at 1010 based on the dropped HARQ-ACK feedback meeting or exceeding the threshold amount. For example, the combined HARQ-ACK feedback may include feedback for one or more PDSCH transmissions that end a threshold amount of time before a beginning of an uplink resource for the combined HARQ-ACK feedback.

As another example, the UE may compare, at 1008, to the threshold amount, dropped HARQ-ACK feedback scheduled for transmission in a resource that starts no later than a starting time of an uplink resource for the combined HARQ-ACK feedback, where the UE transmits the combined HARQ-ACK feedback, at 1010, based on the dropped HARQ-ACK feedback meeting or exceeding the threshold amount. As another example, the UE may compare, at 1008, to the threshold amount, dropped HARQ-ACK feedback scheduled for transmission in a resource that ends no later than a starting time of an uplink resource for the combined HARQ-ACK feedback, where the UE transmits the combined HARQ-ACK feedback, at 1010, based on the dropped HARQ-ACK feedback meeting or exceeding the threshold amount. In some aspects, the combined HARQ-ACK feedback, at 1010 may include the HARQ-ACK feedback that is dropped from each of one or more resources that start no later than a starting time of an uplink resource for the combined HARQ-ACK feedback. In some aspects, the combined HARQ-ACK feedback, at 1010, includes the dropped HARQ-ACK feedback scheduled for transmission in a resource that ends no later than a starting time of an uplink resource for the combined HARQ-ACK feedback.

Figure 11:
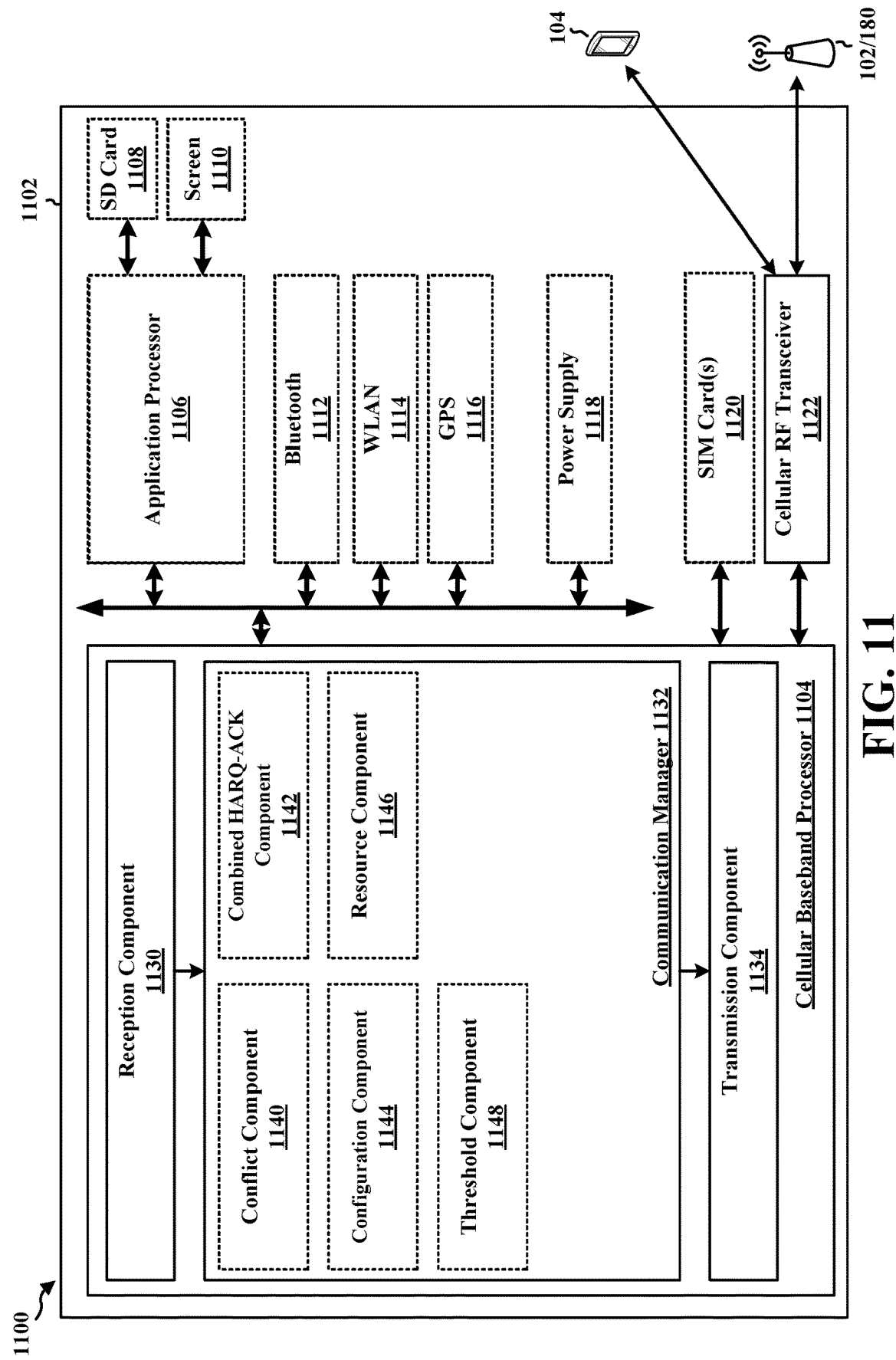
FIG. 11 is a diagram illustrating an example of a hardware implementation for an example apparatus that is configured to transmit combined HARQ-ACK feedback.

FIG. 11 is a diagram 1100 illustrating an example of a hardware implementation for an apparatus 1102. The apparatus 1102 may be a UE or a component of a UE and includes a cellular baseband processor 1104 (also referred to as a modem) coupled to a cellular RF transceiver 1122. In some aspects, the apparatus may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and/or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a conflict component 1140 that is configured to drop transmission of HARQ-Ack feedback for one or more HARQ processes, e.g., as described in connection with 1006 in FIG. 10. The communication manager 1132 further includes a combined HARQ-ACK component 1142 that is configured to transmit a combined HARQ-ACK feedback triggered by the UE dropping a threshold amount of HARQ-ACK feedback, e.g., as described in connection with 1010 in FIG. 10. The communication manager 1132 further includes a configuration component 1144 that is configured to receive a configuration of a threshold amount of HARQ-ACK feedback, e.g., as described in connection with 1004 in FIG. 10. The communication manager 1132 further includes a resource component 1146 that is configured to receive an allocation of periodic uplink resources to transmit the combined HARQ-ACK feedback, e.g., as described in connection with 1002 in FIG. 10. The communication manager 1132 further includes a threshold component 1148 that is configured to compare dropped HARQ-ACK feedback to threshold amount, e.g., as described in connection with any of the details of 1008 in FIG. 10.

The apparatus may include additional components that perform each of the blocks of the algorithm in the flowchart of FIG. 10 and/or the aspects performed by the UE in FIG. 7. As such, each block in the flowchart of FIG. 10 and/or the aspects performed by the UE in FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for dropping transmission of HARQ-ACK feedback for one or more downlink HARQ processes and means for transmitting, to a base station, a combined HARQ-ACK feedback triggered by the UE dropping a threshold amount of HARQ-ACK feedback, the combined HARQ-ACK feedback including dropped HARQ-ACK feedback for the one or more downlink HARQ processes. The apparatus 1102 may further include means for receiving, from the base station, a configuration of the threshold amount of the HARQ-ACK feedback. The apparatus 1102 may further include means for receiving, from the base station, a configuration for a first threshold for the HARQ-ACK feedback that is dropped based on overlapping with an uplink transmission and a second threshold for the HARQ-ACK feedback that is dropped based on overlapping with downlink reception. The apparatus 1102 may further include means for receiving, from the base station, a configuration for a first threshold number of dropped bits for the HARQ-ACK feedback of a first priority level and a second threshold number of dropped bits for the HARQ-ACK feedback of a second priority level. The apparatus 1102 may further include means for receiving, from the base station, a configuration for at least one of a first threshold number of dropped ACKs and a second threshold number of dropped NACKs. The apparatus 1102 may further include means for receiving an allocation of periodic uplink resources to transmit the combined HARQ-ACK feedback, where the UE transmits the combined HARQ-ACK feedback in an instance of the periodic uplink resources. The apparatus 1102 may further include means for transmitting an indication to the base station to request an uplink resource for transmitting the combined HARQ-ACK feedback; and means for receiving a grant allocating the uplink resource for transmitting the combined HARQ-ACK feedback, wherein the UE transmits the combined HARQ-ACK feedback in the resources allocated in the grant. The apparatus 1102 may further include means for comparing dropped HARQ-ACK feedback to the threshold amount, the dropped HARQ-ACK feedback corresponding to a PDSCH that ends a threshold amount of time before a beginning of an uplink resource for the combined HARQ-ACK feedback, where the apparatus transmits the combined HARQ-ACK feedback based on the dropped HARQ-ACK feedback meeting or exceeding the threshold amount. The apparatus 1102 may further include means for comparing, to the threshold amount, dropped HARQ-ACK feedback scheduled for transmission in a resource that starts no later than a starting time of an uplink resource for the combined HARQ-ACK feedback, where the UE transmits the combined HARQ-ACK feedback based on the dropped HARQ-ACK feedback meeting or exceeding the threshold amount. The apparatus 1102 may further include means for comparing, to the threshold amount, dropped HARQ-ACK feedback scheduled for transmission in a resource that ends no later than a starting time of an uplink resource for the combined HARQ-ACK feedback, wherein the UE transmits the combined HARQ-ACK feedback based on the dropped HARQ-ACK feedback meeting or exceeding the threshold amount. The means may be one or more of the components of the apparatus 1102 configured to perform the functions recited by the means. As described herein, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
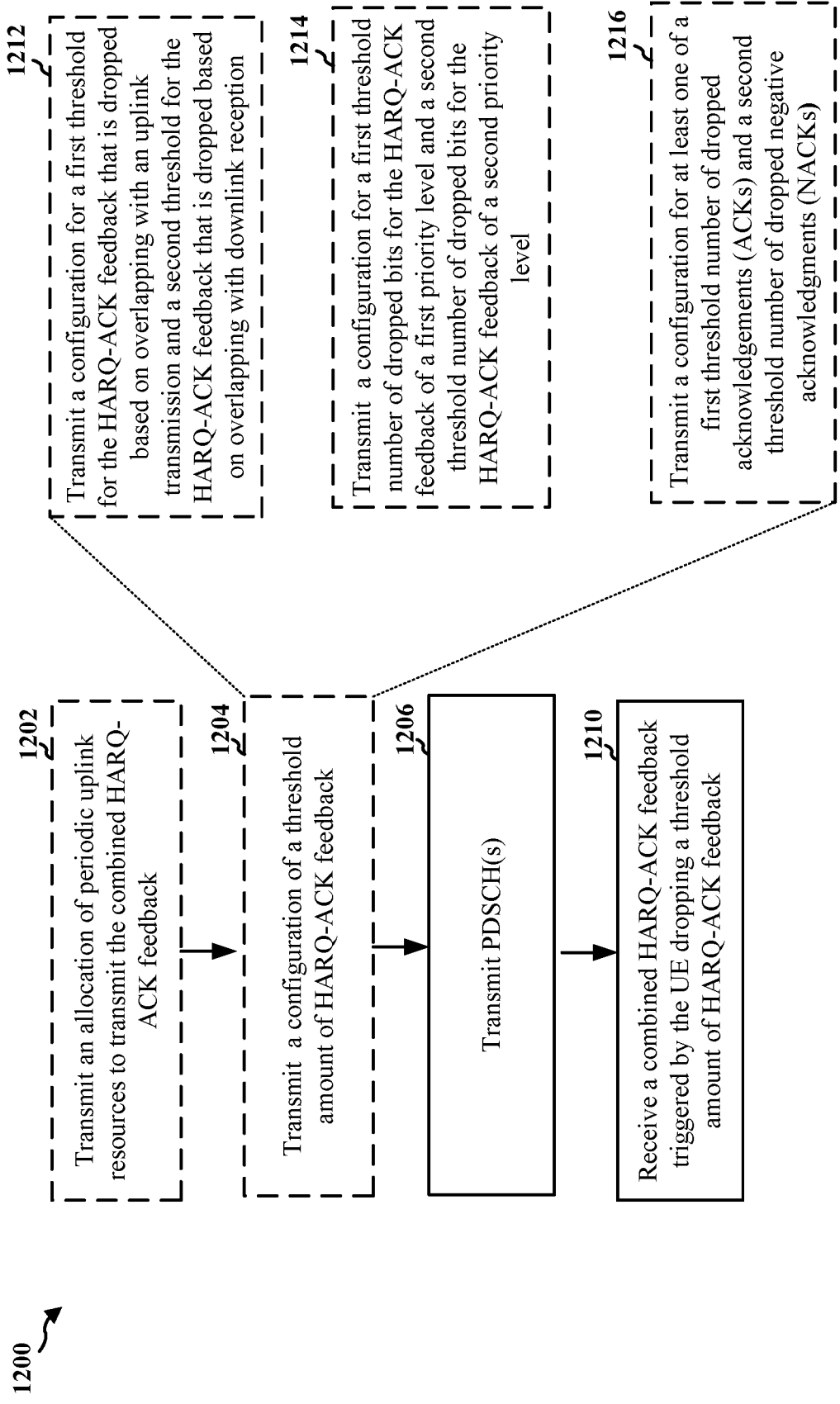
FIG. 12 is a flowchart of a method of wireless communication including the reception of combined HARQ-ACK feedback.

FIG. 12 is a flowchart 1200 of a method of wireless communication. The method may be performed by a base station (e.g., the base station 102, 180, 310, 704; the apparatus 1302). Optional aspects are illustrated with a dashed line. The method may enable a base station to recover skipped HARQ-ACK feedback from a UE in a more efficient manner through an event triggered type-2 HARQ-ACK feedback.

At 1206, the base station transmits to a UE, PDSCH transmissions for one or more HARQ processes. FIGS. 4A-9 each illustrate various aspects of PDSCH transmission by a base station. For example, FIG. 7 illustrates a base station 704 transmitting PDSCH 710 and/or 714. The transmission of the PDSCH may be performed, e.g., by the PDSCH component 1340 via the transmission component 1334 and the RF transceiver 1322 of the apparatus 1302.

At 1210, the base station receives, from the UE, a combined HARQ-ACK feedback triggered at the UE based on a threshold amount of dropped HARQ-ACK feedback, the combined HARQ-ACK feedback including the dropped HARQ-ACK feedback for one or more downlink HARQ processes. The combined HARQ-ACK feedback may also include non-dropped HARQ-ACK feedback. The combined HARQ-ACK feedback may comprise Type 3 HARQ-ACK feedback, which may be referred to as one-shot HARQ-ACK feedback or a full HARQ report. FIGS. 4B, 5, 6A-6C, 7, 8, and 9 illustrate aspects of combined HARQ-ACK feedback. The reception of the combined HARQ-ACK feedback may be performed, e.g., by the combined HARQ-ACK reception component 1342 of the apparatus 1302.

The combined HARQ-ACK feedback may include feedback for one or more PDSCH transmissions that end a threshold amount of time before a beginning of an uplink resource for the combined HARQ-ACK feedback. The combined HARQ-ACK feedback may include the HARQ-ACK feedback that is dropped from each of one or more resources that start no later than a starting time of an uplink resource for the combined HARQ-ACK feedback, e.g., as described in connection with aspects of FIG. 9. The combined HARQ-ACK feedback may include combined HARQ-ACK feedback includes the dropped HARQ-ACK feedback scheduled for transmission in a resource that ends no later than a starting time of an uplink resource for the combined HARQ-ACK feedback, e.g., as described in connection with aspects of FIG. 9. FIG. 9 illustrates aspects of the counting of the HARQ-ACK feedback for the purpose of determining whether the threshold amount is met that triggered the combined HARQ-ACK feedback. FIG. 9 also illustrates aspects of determining which HARQ-ACK feedback to include when the combined HARQ-ACK feedback has been triggered.

As illustrated at 1204, the base station may configure the UE with the threshold amount of the HARQ-ACK feedback. The configuration of the UE with the threshold may be performed, e.g., by the configuration component 1344 of the apparatus 1302 in FIG. 13. In some aspects, the threshold amount of HARQ-ACK feedback may comprise a threshold number of dropped HARQ-ACK bits. As illustrated at 1212, the base station may transmit a configuration for a first threshold for the HARQ-ACK feedback that is dropped based on overlapping with an uplink transmission and a second threshold for the HARQ-ACK feedback that is dropped based on overlapping with downlink reception. As illustrated at 1214, the base station, may transmit a configuration for a first threshold number of dropped bits for the HARQ-ACK feedback of a first priority level and a second threshold number of dropped bits for the HARQ-ACK feedback of a second priority level. In some aspects, the threshold amount of the HARQ-ACK feedback may be based on content of the HARQ-ACK feedback. As illustrated at 1216, the base station may transmit, a configuration for at least one of a first threshold number of dropped ACKs and a second threshold number of dropped NACKs.

In some aspects, the base station may transmit an allocation of periodic uplink resources for the UE to transmit the combined HARQ-ACK feedback, at 1202, where the base station receives the combined HARQ-ACK feedback, at 1210, in an instance of the periodic uplink resources. The transmission of the allocation of the periodic uplink resources may be performed, e.g., by the resource component 1346 of the apparatus 1302 in FIG. 13. FIGS. 8 and 9 illustrate examples of periodic resources for a type-3 HARQ-ACK feedback. FIG. 7 illustrates the base station 704 scheduling 708 for periodic resources for the transmission of the type-3 HARQ-ACK feedback.

In other aspects, the base station may receive an indication from the UE to request an uplink resource for transmitting the combined HARQ-ACK feedback and may transmit a grant allocating the uplink resource for transmitting the combined HARQ-ACK feedback, where the base station receives the combined HARQ-ACK feedback, at 1210, in the resources allocated in the grant. FIG. 7 illustrates an example of the UE 702 sending a request 720 for a resource for transmitting the combined HARQ-ACK feedback.

Figure 13:
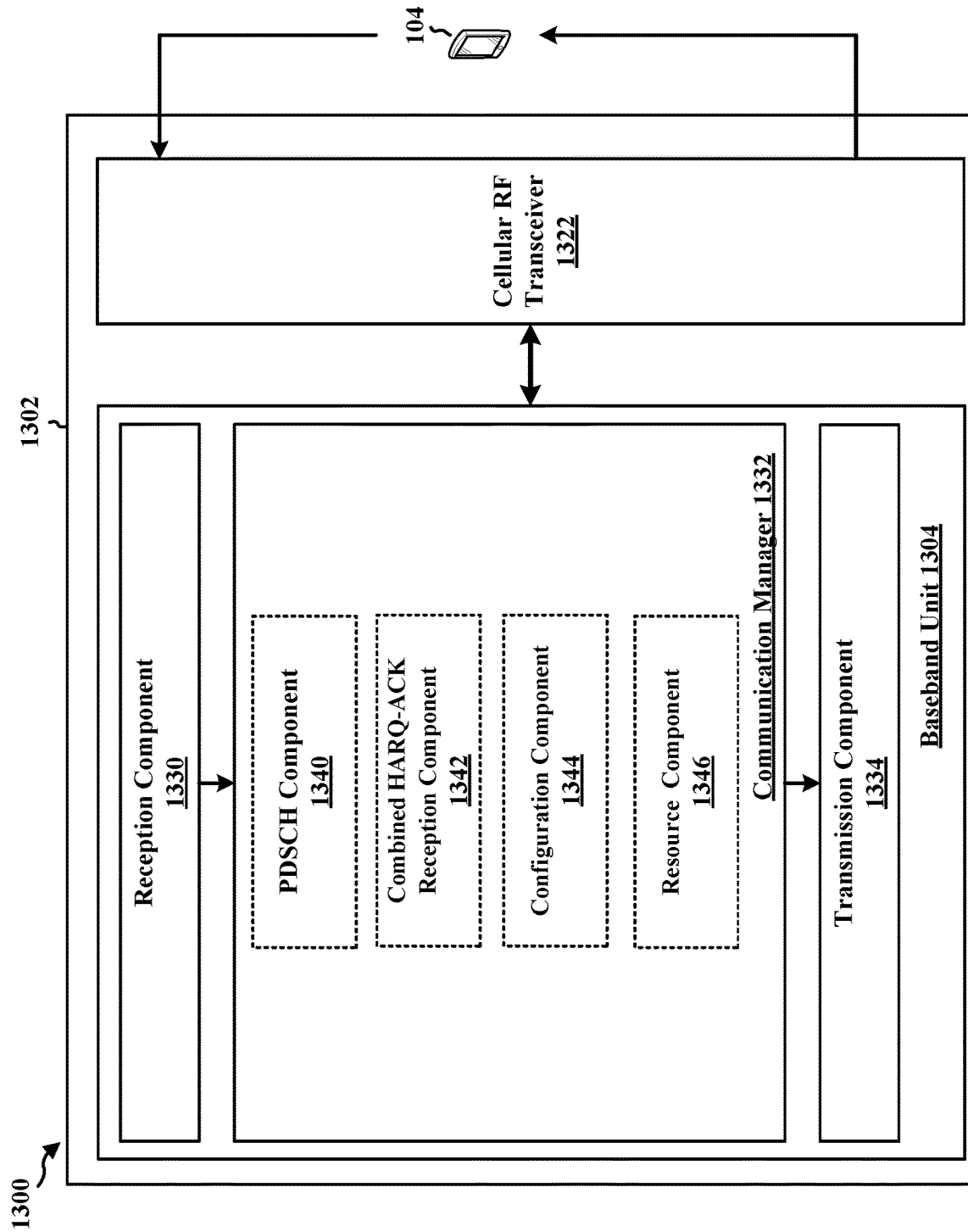
FIG. 13 is a diagram illustrating an example of a hardware implementation for an example apparatus that is configured to receive combined HARQ-ACK feedback.

FIG. 13 is a diagram 1300 illustrating an example of a hardware implementation for an apparatus 1302. The apparatus 1302 may be a base station or a component of a base station and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a PDSCH component 1340 that is configured to transmit to a UE, PDSCH transmissions for one or more HARQ processes, e.g., as described in connection with 1206 in FIG. 12. The communication manager 1332 further includes a combined HARQ-ACK reception component 1342 that is configured to receive a combined HARQ-ACK feedback triggered by the UE dropping a threshold amount of HARQ-ACK feedback, e.g., as described in connection with 1210 in FIG. 12. The communication manager 1332 further includes a configuration component 1344 that is configured to transmit a configuration of a threshold amount of HARQ-ACK feedback, e.g., as described in connection with any of the aspects of 1204 in FIG. 12. The communication manager 1332 further includes a resource component 1346 that is configured to transmit an allocation of periodic uplink resources to transmit the combined HARQ-ACK feedback, e.g., as described in connection with 1202 in FIG. 12.

The apparatus may include additional components that perform each of the blocks of the algorithm in the aforementioned flowchart of FIG. 12 and/or any of the aspects performed by the base station in FIG. 7. As such, each block in the aforementioned flowchart of FIG. 12 and/or any of the aspects performed by the base station in FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting, to a UE, PDSCH transmissions for one or more HARQ processes and means for receiving, from the UE, a combined HARQ-ACK feedback triggered at the UE based on a threshold amount of dropped HARQ-ACK feedback, the combined HARQ-ACK feedback including the dropped HARQ-ACK feedback for one or more downlink HARQ processes. The apparatus 1302 may further include means for configuring the threshold amount of the HARQ-ACK feedback for the UE. The apparatus 1302 may further include means for transmitting, to the UE, a configuration for a first threshold for the HARQ-ACK feedback that is dropped based on overlapping with an uplink transmission and a second threshold for the HARQ-ACK feedback that is dropped based on overlapping with downlink reception. The apparatus 1302 may further include means for transmitting, to the UE, a configuration for a first threshold number of dropped bits for the HARQ-ACK feedback of a first priority level and a second threshold number of dropped bits for the HARQ-ACK feedback of a second priority level. The apparatus 1302 may further include means for transmitting, to the UE, a configuration for at least one of a first threshold number of dropped ACKs and a second threshold number of dropped NACKs. The apparatus 1302 may further include means for allocating periodic uplink resources to the UE for transmission of the combined HARQ-ACK feedback, wherein the base station receives the combined HARQ-ACK feedback in an instance of the periodic uplink resources. The apparatus 1302 may further include means for receiving an indication from the UE requesting an uplink resource for transmitting the combined HARQ-ACK feedback; and means for transmitting a grant allocating the uplink resource for transmitting the combined HARQ-ACK feedback, wherein the base station receives the combined HARQ-ACK feedback in the resources allocated in the grant. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects, examples, or teachings described herein, without limitation.

Aspect 1 is a method of wireless communication at a UE, comprising: dropping transmission of HARQ-ACK feedback for one or more downlink HARQ processes; and transmitting, to a base station, a combined HARQ-ACK feedback triggered by the UE dropping a threshold amount of HARQ-ACK feedback, the combined HARQ-ACK feedback including dropped HARQ-ACK feedback for the one or more downlink HARQ processes.

In aspect 2, the method of aspect 1 further includes that the combined HARQ-ACK feedback comprises Type 3 HARQ-ACK feedback.

In aspect 3, the method of aspect 1 or aspect 2 further includes that the threshold amount of HARQ-ACK feedback comprises a threshold number of dropped HARQ-ACK bits.

In aspect 4, the method of any of aspects 1-3 further includes receiving, from the base station, a configuration of the threshold amount of the HARQ-ACK feedback.

In aspect 5, the method of any of aspects 1-4 further includes receiving, from the base station, a configuration for a first threshold for the HARQ-ACK feedback that is dropped based on overlapping with an uplink transmission and a second threshold for the HARQ-ACK feedback that is dropped based on overlapping with downlink reception.

In aspect 6, the method of any of aspects 1-5 further includes receiving, from the base station, a configuration for a first threshold number of dropped bits for the HARQ-ACK feedback of a first priority level and a second threshold number of dropped bits for the HARQ-ACK feedback of a second priority level.

In aspect 7, the method of any of aspects 1-6 further includes that the threshold amount of the HARQ-ACK feedback is based on content of the HARQ-ACK feedback.

In aspect 8, the method of aspect 7 further includes receiving, from the base station, a configuration for at least one of a first threshold number of dropped ACKs and a second threshold number of dropped NACKs.

In aspect 9, the method of any of aspects 1-8 further includes receiving an allocation of periodic uplink resources to transmit the combined HARQ-ACK feedback, wherein the UE transmits the combined HARQ-ACK feedback in an instance of the periodic uplink resources.

In aspect 10, the method of any of aspects 1-8 further includes transmitting an indication to the base station to request an uplink resource for transmitting the combined HARQ-ACK feedback; and receiving a grant allocating the uplink resource for transmitting the combined HARQ-ACK feedback, wherein the UE transmits the combined HARQ-ACK feedback in the resources allocated in the grant.

In aspect 11, the method of any of aspects 1-10 further includes comparing dropped HARQ-ACK feedback to the threshold amount, the dropped HARQ-ACK feedback corresponding to a PDSCH that ends a threshold amount of time before a beginning of an uplink resource for the combined HARQ-ACK feedback, wherein the UE transmits the combined HARQ-ACK feedback based on the dropped HARQ-ACK feedback meeting or exceeding the threshold amount.

In aspect 12, the method of any of aspects 1-11 further includes that the combined HARQ-ACK feedback includes feedback for one or more PDSCH transmissions that end a threshold amount of time before a beginning of an uplink resource for the combined HARQ-ACK feedback.

In aspect 13, the method of any of aspects 1-10 further includes comparing, to the threshold amount, dropped HARQ-ACK feedback scheduled for transmission in a resource that starts no later than a starting time of an uplink resource for the combined HARQ-ACK feedback, wherein the UE transmits the combined HARQ-ACK feedback based on the dropped HARQ-ACK feedback meeting or exceeding the threshold amount.

In aspect 14, the method of any of aspects 1-10 or 13 further includes that the combined HARQ-ACK feedback includes the HARQ-ACK feedback that is dropped from each of one or more resources that start no later than a starting time of an uplink resource for the combined HARQ-ACK feedback.

In aspect 15, the method of any of aspects 1-10 further includes comparing, to the threshold amount, dropped HARQ-ACK feedback scheduled for transmission in a resource that ends no later than a starting time of an uplink resource for the combined HARQ-ACK feedback, wherein the UE transmits the combined HARQ-ACK feedback based on the dropped HARQ-ACK feedback meeting or exceeding the threshold amount.

In aspect 16, the method of any of aspects 1-10 or 15 the combined HARQ-ACK feedback includes the dropped HARQ-ACK feedback scheduled for transmission in a resource that ends no later than a starting time of an uplink resource for the combined HARQ-ACK feedback.

Aspect 17 is an apparatus for wireless communication at a UE, comprising: a memory; and at least one processor coupled to the memory and configured to: drop transmission of HARQ-ACK feedback for one or more downlink HARQ processes; and transmit, to a base station, a combined HARQ-ACK feedback triggered by the UE dropping a threshold amount of HARQ-ACK feedback, the combined HARQ-ACK feedback including dropped HARQ-ACK feedback for the one or more downlink HARQ processes.

In aspect 18, the apparatus of aspect 17 includes the memory and the at least one processor that are further configured to perform the method of any of aspects 2-16.

Aspect 19 is an apparatus for wireless communication at a UE, comprising: means dropping transmission of HARQ-ACK feedback for one or more downlink HARQ processes; and means for transmitting, to a base station, a combined HARQ-ACK feedback triggered by the UE dropping a threshold amount of HARQ-ACK feedback, the combined HARQ-ACK feedback including dropped HARQ-ACK feedback for the one or more downlink HARQ processes.

In aspect 20, the apparatus for wireless communication of aspect 19, further comprises means to perform the method of any of aspects 2-16.

Aspect 21 is a non-transitory computer-readable storage medium storing computer executable code at a UE, the code when executed by a processor causes the processor to drop transmission of HARQ-ACK feedback for one or more downlink HARQ processes; and transmit, to a base station, a combined HARQ-ACK feedback triggered by the UE dropping a threshold amount of HARQ-ACK feedback, the combined HARQ-ACK feedback including dropped HARQ-ACK feedback for the one or more downlink HARQ processes.

In aspect 22, the computer-readable medium of aspect 21 further includes code that when executed by the processor causes the processor to perform the method of any of aspects 2-16.

Aspect 23 is a method of wireless communication at a base station, comprising: transmitting, to a UE, PDSCH transmissions for one or more HARQ processes; and receiving, from the UE, a combined HARQ-ACK feedback triggered at the UE based on a threshold amount of dropped HARQ-ACK feedback, the combined HARQ-ACK feedback including the dropped HARQ-ACK feedback for one or more downlink HARQ processes.

In aspect 24, the method of aspect 23 further includes that the combined HARQ-ACK feedback comprises Type 3 HARQ-ACK feedback.

In aspect 25, the method of aspect 23 or aspect 24 further includes that the threshold amount of HARQ-ACK feedback comprises a threshold number of dropped HARQ-ACK bits.

In aspect 26, the method of any of aspects 23-25 further includes configuring the threshold amount of the HARQ-ACK feedback for the UE.

In aspect 27, the method of any of aspects 23-26 further includes transmitting, to the UE, a configuration for a first threshold for the HARQ-ACK feedback that is dropped based on overlapping with an uplink transmission and a second threshold for the HARQ-ACK feedback that is dropped based on overlapping with downlink reception.

In aspect 28, the method of any of aspects 23-27 further includes transmitting, to the UE, a configuration for a first threshold number of dropped bits for the HARQ-ACK feedback of a first priority level and a second threshold number of dropped bits for the HARQ-ACK feedback of a second priority level.

In aspect 29, the method of any of aspects 23-28 further includes that the threshold amount of the HARQ-ACK feedback is based on content of the HARQ-ACK feedback.

In aspect 30, the method of any of aspects 23-29 further includes transmitting, to the UE, a configuration for at least one of a first threshold number of dropped ACKs and a second threshold number of dropped NACKs.

In aspect 31, the method of any of aspects 23-30 further includes allocating periodic uplink resources to the UE for transmission of the combined HARQ-ACK feedback, wherein the base station receives the combined HARQ-ACK feedback in an instance of the periodic uplink resources.

In aspect 32, the method of any of aspects 23-30 further includes receiving an indication from the UE requesting an uplink resource for transmitting the combined HARQ-ACK feedback; and transmitting a grant allocating the uplink resource for transmitting the combined HARQ-ACK feedback, wherein the base station receives the combined HARQ-ACK feedback in the resources allocated in the grant.

In aspect 33, the method of any of aspects 23-32 further includes that the combined HARQ-ACK feedback includes feedback for one or more physical downlink shared channel (PDSCH) transmissions that end a threshold amount of time before a beginning of an uplink resource for the combined HARQ-ACK feedback.

In aspect 34, the method of any of aspects 23-32 further includes that the combined HARQ-ACK feedback includes the HARQ-ACK feedback that is dropped from each of one or more resources that start no later than a starting time of an uplink resource for the combined HARQ-ACK feedback.

In aspect 35, the method of any of aspects 23-32 further includes that the combined HARQ-ACK feedback includes the dropped HARQ-ACK feedback scheduled for transmission in a resource that ends no later than a starting time of an uplink resource for the combined HARQ-ACK feedback.

Aspect 36 is an apparatus for wireless communication at a base station, comprising: a memory; and at least one processor coupled to the memory and configured to: transmit, to a UE, PDSCH transmissions for one or more HARQ processes; and receive, from the UE, a combined HARQ-ACK feedback triggered at the UE based on a threshold amount of dropped HARQ-ACK feedback, the combined HARQ-ACK feedback including the dropped HARQ-ACK feedback for one or more downlink HARQ processes.

In aspect 37, the apparatus of aspect 36 includes the memory and the at least one processor that are further configured to perform the method of any of aspects 24-35.

Aspect 38 is an apparatus for wireless communication at a base station, comprising: means for transmitting, to a UE, PDSCH transmissions for one or more HARQ processes; and means for receiving, from the UE, a combined HARQ-ACK feedback triggered at the UE based on a threshold amount of dropped HARQ-ACK feedback, the combined HARQ-ACK feedback including the dropped HARQ-ACK feedback for one or more downlink HARQ processes.

In aspect 39, the apparatus for wireless communication of aspect 38, further comprises means to perform the method of any of aspects 24-35.

Aspect 40 is a non-transitory computer-readable storage medium storing computer executable code at a base station, the code when executed by a processor causes the processor to: transmit, to a UE, PDSCH transmissions for one or more HARQ processes; and receive, from the UE, a combined HARQ-ACK feedback triggered at the UE based on a threshold amount of dropped HARQ-ACK feedback, the combined HARQ-ACK feedback including the dropped HARQ-ACK feedback for one or more downlink HARQ processes.

In aspect 41, the computer-readable medium of aspect 40, further includes the code when executed by the processor causes the processor to perform the method of any of aspects 24-35.

What is claimed is:

1. An apparatus for wireless communication at a user equipment (UE), comprising:
    a memory; and
    at least one processor coupled to the memory, the memory and the at least one processor configured to:
        drop transmission of hybrid automatic repeat request-acknowledgment (HARQ-ACK) feedback for one or more downlink HARQ processes up to a threshold amount of the HARQ-ACK feedback, the threshold amount of the HARQ-ACK feedback being based on at least one of a type of overlapping transmission, a priority level of dropped bits, or a content of the HARQ-ACK feedback; and transmit, to a base station, a combined HARQ-ACK feedback triggered by the UE dropping the threshold amount of the HARQ-ACK feedback, the combined HARQ-ACK feedback including the dropped HARQ-ACK feedback for the one or more downlink HARQ processes.

2. The apparatus of claim 1, wherein the combined HARQ-ACK feedback comprises Type 3 HARQ-ACK feedback.

3. The apparatus of claim 1, wherein the threshold amount of the HARQ-ACK feedback comprises a threshold number of dropped HARQ-ACK bits.

4. The apparatus of claim 1, wherein the memory and the at least one processor are further configured to:
receive, from the base station, a configuration of the threshold amount of the HARQ-ACK feedback.

5. The apparatus of claim 1, wherein the threshold amount of HARQ-ACK feedback that triggers the combined HARQ-ACK feedback is based on the type of the overlapping transmission, and the memory and the at least one processor are further configured to:
receive, from the base station, a configuration for a first threshold for the HARQ-ACK feedback that is dropped based on overlapping with an uplink transmission and a second threshold for the HARQ-ACK feedback that is dropped based on overlapping with downlink reception.

6. The apparatus of claim 1, wherein the threshold amount of HARQ-ACK feedback that triggers the combined HARQ-ACK feedback is based on the priority level of the dropped bits, the memory and the at least one processor are further configured to:
receive, from the base station, a configuration for a first threshold number of dropped bits for the HARQ-ACK feedback of a first priority level and a second threshold number of dropped bits for the HARQ-ACK feedback of a second priority level.

7. The apparatus of claim 1, wherein the threshold amount of the HARQ-ACK feedback that triggers the combined HARQ-ACK feedback is based on the content of the HARQ-ACK feedback, wherein the memory and the at least one processor are further configured to:
receive, from the base station, a configuration for at least one of a first threshold number of dropped acknowledgements (ACKs) and a second threshold number of dropped negative acknowledgments (NACKs).

8. The apparatus of claim 1, wherein the memory and the at least one processor are further configured to:
receive an allocation of periodic uplink resources to transmit the combined HARQ-ACK feedback and to transmit the combined HARQ-ACK feedback in an instance of the periodic uplink resources.

9. The apparatus of claim 1, wherein the memory and the at least one processor are further configured to:
compare the dropped HARQ-ACK feedback to the threshold amount of the HARQ-ACK feedback, the dropped HARQ-ACK feedback corresponding to a physical downlink shared channel (PDSCH) that ends a threshold amount of time before a beginning of an uplink resource for the combined HARQ-ACK feedback and to transmit the combined HARQ-ACK feedback based on the dropped HARQ-ACK feedback meeting or exceeding the threshold amount of the HARQ-ACK feedback.

10. The apparatus of claim 1, wherein the combined HARQ-ACK feedback includes feedback for one or more physical downlink shared channel (PDSCH) transmissions that end a threshold amount of time before a beginning of an uplink resource for the combined HARQ-ACK feedback.

11. The apparatus of claim 1, wherein the memory and the at least one processor are further configured to:
compare, to the threshold amount, dropped HARQ-ACK feedback scheduled for transmission in a first resource that starts no later than a starting time of an uplink resource for the combined HARQ-ACK feedback and to transmit the combined HARQ-ACK feedback based on the dropped HARQ-ACK feedback meeting or exceeding the threshold amount, or compare, to the threshold amount, dropped HARQ-ACK feedback scheduled for transmission in a second resource that ends no later than the starting time of the uplink resource for the combined HARQ-ACK feedback and to transmit the combined HARQ-ACK feedback based on the dropped HARQ-ACK feedback meeting or exceeding the threshold amount.

12. The apparatus of claim 1, wherein the combined HARQ-ACK feedback includes the HARQ-ACK feedback that is dropped from each of one or more resources that start no later than a starting time of an uplink resource for the combined HARQ-ACK feedback.

13. The apparatus of claim 1, wherein the combined HARQ-ACK feedback includes the dropped HARQ-ACK feedback scheduled for transmission in a resource that ends no later than a starting time of an uplink resource for the combined HARQ-ACK feedback.

14. A method of wireless communication at a user equipment (UE), comprising:
dropping transmission of hybrid automatic repeat request-acknowledgment (HARQ-ACK) feedback for one or more downlink HARQ processes up to a threshold amount of the HARQ-ACK feedback, the threshold amount of the HARQ-ACK feedback being based on at least one of a type of overlapping transmission, a priority level of dropped bits, or a content of the HARQ-ACK feedback; and transmitting, to a base station, a combined HARQ-ACK feedback triggered by the UE dropping the threshold amount of the HARQ-ACK feedback, the combined HARQ-ACK feedback including the dropped HARQ-ACK feedback for the one or more downlink HARQ processes.

15. The method of claim 14, wherein the combined HARQ-ACK feedback comprises Type 3 HARQ-ACK feedback.

16. The method of claim 14, wherein the threshold amount of the HARQ-ACK feedback comprises a threshold number of dropped HARQ-ACK bits.

17. The method of claim 14, further comprising:
receiving, from the base station, a configuration of the threshold amount of the HARQ-ACK feedback.

18. The method of claim 14, wherein the threshold amount of HARQ-ACK feedback that triggers the combined HARQ-ACK feedback is based on the type of the overlapping transmission, the method further comprising:
receiving, from the base station, a configuration for a first threshold for the HARQ-ACK feedback that is dropped based on overlapping with an uplink transmission and a second threshold for the HARQ-ACK feedback that is dropped based on overlapping with downlink reception.

19. The method of claim 14, wherein the threshold amount of HARQ-ACK feedback that triggers the combined HARQ-ACK feedback is based on the priority level of the dropped bits, the method further comprising:
receiving, from the base station, a configuration for a first threshold number of dropped bits for the HARQ-ACK feedback of a first priority level and a second threshold number of dropped bits for the HARQ-ACK feedback of a second priority level.

20. The method of claim 14, wherein the threshold amount of the HARQ-ACK feedback that triggers the combined HARQ-ACK feedback is based on the content of the HARQ-ACK feedback, the method further comprising:
receiving, from the base station, a configuration for at least one of a first threshold number of dropped acknowledgements (ACKs) and a second threshold number of dropped negative acknowledgments (NACKs).

21. The method of claim 14, further comprising:
receiving an allocation of periodic uplink resources to transmit the combined HARQ-ACK feedback, wherein the UE transmits the combined HARQ-ACK feedback in an instance of the periodic uplink resources.

22. The method of claim 14, further comprising:
comparing dropped HARQ-ACK feedback to the threshold amount of the HARQ-ACK feedback, the dropped HARQ-ACK feedback corresponding to a physical downlink shared channel (PDSCH) that ends a threshold amount of time before a beginning of an uplink resource for the combined HARQ-ACK feedback, wherein the UE transmits the combined HARQ-ACK feedback based on the dropped HARQ-ACK feedback meeting or exceeding the threshold amount of the HARQ-ACK feedback.

23. The method of claim 14, wherein the combined HARQ-ACK feedback includes feedback for one or more physical downlink shared channel (PDSCH) transmissions that end a threshold amount of time before a beginning of an uplink resource for the combined HARQ-ACK feedback.

24. The method of claim 14, further comprising:
comparing, to the threshold amount, dropped HARQ-ACK feedback scheduled for transmission in a first resource that starts no later than a starting time of an uplink resource for the combined HARQ-ACK feedback, wherein the UE transmits the combined HARQ-ACK feedback based on the dropped HARQ-ACK feedback meeting or exceeding the threshold amount, or
comparing, to the threshold amount, dropped HARQ-ACK feedback scheduled for transmission in a second resource that ends no later than the starting time of the uplink resource for the combined HARQ-ACK feedback, wherein the UE transmits the combined HARQ-ACK feedback based on the dropped HARQ-ACK feedback meeting or exceeding the threshold amount.

25. The method of claim 14, wherein the combined HARQ-ACK feedback includes the HARQ-ACK feedback that is dropped from each of one or more resources that start no later than a starting time of an uplink resource for the combined HARQ-ACK feedback.

26. The method of claim 14, wherein the combined HARQ-ACK feedback includes the dropped HARQ-ACK feedback scheduled for transmission in a resource that ends no later than a starting time of an uplink resource for the combined HARQ-ACK feedback.

27. An apparatus for wireless communication at a base station, comprising:
a memory; and
at least one processor coupled to the memory, the memory and the at least one processor configured to:
configure a user equipment (UE) for a threshold amount of hybrid automatic repeat request acknowledgement (HARQ-ACK) feedback, the threshold amount of the HARQ-ACK feedback being based on at least one of a type of overlapping transmission, a priority level of dropped bits, or a content of the HARQ-ACK feedback;
transmit physical downlink shared channel (PDSCH) transmissions for one or more HARQ processes; and
receive a combined HARQ ACK feedback triggered at the UE based on the threshold amount of dropped HARQ-ACK feedback, the combined HARQ-ACK feedback including the dropped HARQ-ACK feedback for one or more downlink HARQ processes.

28. The apparatus of claim 27, wherein the memory and the at least one processor are further configured to:
allocate periodic uplink resources to the UE for transmission of the combined HARQ-ACK feedback.

29. A method of wireless communication at a base station, comprising:
configuring a user equipment (UE) for a threshold amount of hybrid automatic repeat request acknowledgement (HARQ-ACK) feedback, the threshold amount of the HARQ-ACK feedback being based on at least one of a type of overlapping transmission, a priority level of dropped bits, or a content of the HARQ-ACK feedback;
transmitting physical downlink shared channel (PDSCH) transmissions for one or more HARQ processes; and
receiving a combined HARQ-ACK feedback triggered at the UE based on the threshold amount of dropped HARQ-ACK feedback, the combined HARQ-ACK feedback including the dropped HARQ-ACK feedback for one or more downlink HARQ processes.

30. The method of claim 29, further comprising:
allocating periodic uplink resources to the UE for transmission of the combined HARQ-ACK feedback, wherein the base station receives the combined HARQ-ACK feedback in an instance of the periodic uplink resources.

* * * * *